(12) United States Patent
Kaneta et al.

(10) Patent No.: US 11,608,924 B2
(45) Date of Patent: Mar. 21, 2023

(54) INSTALLATION METHOD AND INSTALLATION DEVICE FOR FLUID CONTROL DEVICE

(71) Applicant: COSMO KOKI CO., LTD., Tokyo (JP)

(72) Inventors: Naoki Kaneta, Tokyo (JP); Satoshi Tamada, Tokyo (JP)

(73) Assignee: COSMO KOKI CO., LTD.

( * ) Notice: Subject to any disclaimer, the term of this patent is extended or adjusted under 35 U.S.C. 154(b) by 73 days.

(21) Appl. No.: 17/266,064

(22) PCT Filed: Jul. 18, 2019

(86) PCT No.: PCT/JP2019/028224
§ 371 (c)(1),
(2) Date: Feb. 4, 2021

(87) PCT Pub. No.: WO2020/049879
PCT Pub. Date: Mar. 12, 2020

(65) Prior Publication Data
US 2021/0254772 A1    Aug. 19, 2021

(30) Foreign Application Priority Data

Sep. 5, 2018  (JP) .............................. JP2018-166359

(51) Int. Cl.
| | |
|---|---|
| *F16L 41/06* | (2006.01) |
| *F16K 27/00* | (2006.01) |
| *F16K 43/00* | (2006.01) |
| *F16L 55/00* | (2006.01) |

(52) U.S. Cl.
CPC .............. *F16L 41/06* (2013.01); *F16K 27/00* (2013.01); *F16K 43/00* (2013.01); *F16L 55/00* (2013.01)

(58) Field of Classification Search
CPC ......... F16K 27/00; F16K 43/00; F16L 41/06; F16L 55/00
See application file for complete search history.

(56) References Cited

U.S. PATENT DOCUMENTS

| | | | |
|---|---|---|---|
| 2001/0010233 A1* | 8/2001 | Sato ...................... | F16L 55/105 137/318 |
| 2012/0192962 A1 | 8/2012 | Asai ........................ | 137/315.29 |

FOREIGN PATENT DOCUMENTS

| | | | |
|---|---|---|---|
| JP | 2000-120889 | 4/2000 | ............... F16K 3/28 |
| JP | 2007-309490 | 11/2007 | ............... F16L 55/00 |
| JP | 2009-115296 | 5/2009 | ............... F16L 41/06 |
| JP | 2011-38584 | 2/2011 | ............... F16K 43/00 |

(Continued)

OTHER PUBLICATIONS

Australian Official Action issued in related Australian Patent Application Serial No. 2019335644, dated Dec. 17, 2021 (7 pages).

(Continued)

*Primary Examiner* — Kevin R Barss
(74) *Attorney, Agent, or Firm* — Hayes Soloway P.C.

(57) ABSTRACT

Provided are an installation method and an installation device for a fluid control device capable of improving controllability of a fluid in a pipe by improving positional accuracy of a valve body inserted into a hole formed in a fluid pipe in a housing and decreasing the size, weight, and cost of construction equipment such as an operation valve device or an installation device of a fluid control valve.

20 Claims, 23 Drawing Sheets

(56) References Cited

FOREIGN PATENT DOCUMENTS

| JP | 2012-7654 | 1/2012 | ............. | F16L 58/02 |
| JP | 2013-190087 | 9/2013 | ............. | F16L 55/00 |
| JP | 2013-199984 | 10/2013 | ............. | F16L 55/00 |
| JP | 2015034604 | 2/2015 | ............. | F16K 3/00 |
| JP | 2016-98920 | 5/2016 | ............. | F16L 55/00 |

OTHER PUBLICATIONS

International Search Report (with English translation) and Written Opinion issued in PCT/JP2019/028224, dated Aug. 27, 2019, 9 pages.
Extended European Search Report issued in related Application Serial No. 19857392.5-1015, dated May 9, 2022 (9 pages).
Canadian Official Action issued in related Application Serial No. 3,108,853, dated Apr. 20, 2022 (4 pages).
International Preliminary Report on Patentability issued in PCT/JP2019/028224, dated Mar. 18, 2021, 8 pages.
Singapore Official Action issued in related Application Serial No. 11202101270T, dated Jan. 20, 2022 (10 pages).

\* cited by examiner

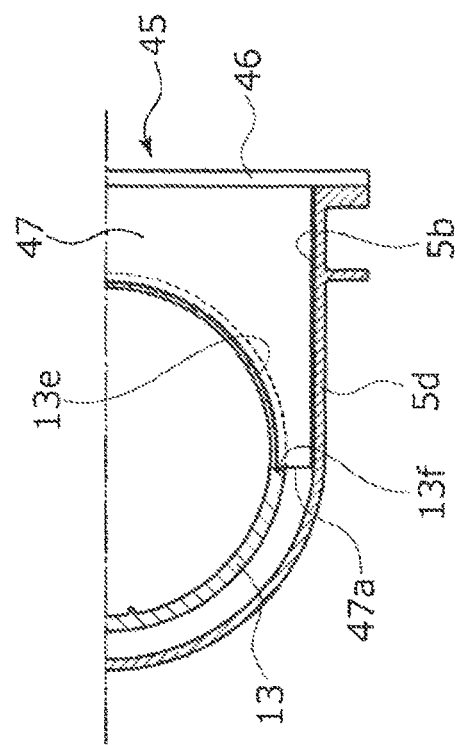
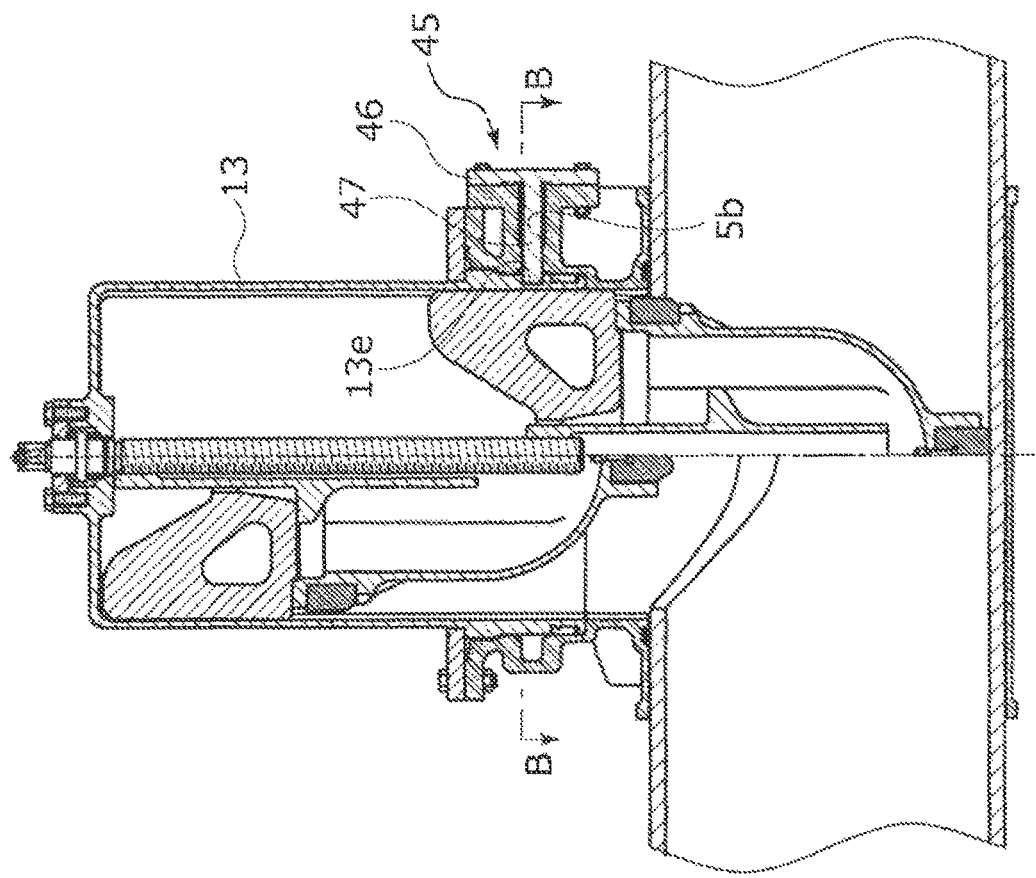
Fig. 16(a)
Fig. 16(b)

US 11,608,924 B2

INSTALLATION METHOD AND INSTALLATION DEVICE FOR FLUID CONTROL DEVICE

TECHNICAL FIELD

The present invention relates to an installation method and an installation device for a fluid control device, including at least a housing installed in a fluid pipe in a sealed state and a fluid control valve controlling a fluid in a pipe by inserting a valve body into a hole of the fluid pipe formed in the housing, in a continuous flow state.

BACKGROUND ART

An installation method and an installation device for a fluid control device of the related art are used to control a fluid in a pipe by externally fitting a housing with a split structure (split (tee) to an existing fluid pipe in a sealed state, connecting an operation valve device (a process valve) to an open end portion of an upper end of a neck portion constituting the housing, inserting a fluid control valve (a valve bonnet and a sluice valve body) through the operation valve device closing the housing using the installation device of the fluid control valve (a working housing, an operation bar, and a jack mechanism) to be connected to the housing, inserting the valve body of the fluid control valve into the pipe through a hole of the fluid pipe, and using an inner peripheral surface of the fluid pipe as a valve seat (for example, see Patent Document 1).

CITATION LIST

Patent Documents

Patent Document 1: JP 2011-38584 A (Page 18, FIG. 33)

SUMMARY OF INVENTION

Technical Problem

However, in Patent Document 1, the operation valve device was connected to the open end portion formed in the upper end of the neck portion of the split T-shaped pipe constituting the housing externally fitted to the fluid pipe, the installation device of the fluid control valve was connected to the upper end of the operation valve device in an overlapping state, and the fluid control valve was connected to the open end portion of the upper end of the neck portion of the housing in a sealed state. Thus, since the extension stroke of the installation device of the fluid control valve increased and a positional deviation occurred such that the valve body could not be inserted into a designed position, a problem occurred in that the high controllability of the fluid in the pipe could not be maintained. Further, since construction equipment such as the operation valve device or the installation device of the fluid control valve increased in size as the extension stroke increased, the equipment and construction costs were expensive and their weight also caused an excessive load on the existing fluid pipes.

The present invention has been made in view of such circumstances and an object of the present invention is to provide an installation method and an installation device for a fluid control device capable of improving controllability of a fluid in a pipe by improving positional accuracy of a valve body inserted into a hole formed in a fluid pipe in a housing and decreasing the size, weight, and cost of construction equipment such as an operation valve device or an installation device of a fluid control valve.

Solution to Problem

In order to solve the foregoing problems, an installation method for a fluid control device according to the present invention is a method of installing a fluid control device in a continuous flow state, the fluid control device including at least a housing installed in a fluid pipe in a sealed state and a fluid control valve having a valve body and a valve housing insertable into a hole of the fluid pipe formed in the housing, characterized by including: installing at an opening formed in a neck portion of the housing, an operation valve device having an operation valve body dividing an inside of the housing in an openable and closeable manner; opening the operation valve body while surrounding an open end portion formed in the neck portion in a sealed state; and inserting the fluid control valve communicating with the inside of the housing in a sealed state from the open end portion to an installation position in which a front end of the valve housing of the fluid control valve exceeds the opening of the neck portion so that an annular sealing member seals a gap between a peripheral surface of the valve housing and a peripheral surface of the neck portion at the installation position while an inner part side of the open end portion and an outer part side surrounding the open end portion in a sealed state have the same pressure.

According to this characteristic, since the annular sealing member can perform a sealing operation at the installation position in which the front end of the valve housing of the fluid control valve exceeds the opening in the neck portion while the inner part side of the open end portion and the outer part side surrounding the open end portion in a sealed state have the same pressure, the opening and the open end portion can be closed at the same time in a sealed state. Accordingly, even when the fluid pipe has a relatively large diameter, the fluid control valve can be accurately installed at a desired position by reducing a pressing force required for installing the fluid control valve and a support point when inserting the valve body of the fluid control valve into the hole of the fluid pipe is secured. Accordingly, the controllability of the fluid in the pipe can be improved by improving the positional accuracy of the valve body. Further, the operation valve device which is decreased in weight and size can be easily attached and detached without requiring the operation of the valve body.

It may be characterized in that the inside of the housing divided by the operation valve body is made in a communication state and air in the housing is discharged to the outside.

According to this characteristic, since air in the housing can be discharged when allowing the inside of the housing divided by the operation valve body to be in a communication state, the fluid in the pipe can be filled into the housing.

It may be characterized in that the housing is a split structure for externally fitting the fluid pipe in a sealed state and the hole of the fluid pipe is bored by a boring machine.

According to this characteristic, the valve body can be inserted by forming a hole in the existing fluid pipe in such a manner that the fluid pipe is bored in a continuous flow state. Particularly, since the opening for attaching and detaching the operation valve device is provided in the neck portion of the housing and the installation position of the operation valve device can be made close to the fluid pipe, the boring stroke is shortened. Accordingly, it is possible to minimize the boring positional deviation and to decrease the size, weight, and cost of construction equipment such as a boring machine or an operation valve device.

It may be characterized in that movement prevention means for preventing the housing from moving is installed in the fluid pipe.

According to this characteristic, since it is possible to prevent the movement of the housing by the movement prevention means even when the pressure of the fluid in the pipe is applied to the housing when closing the fluid control valve, it is possible to maintain the high controllability of the fluid. Further, when the movement prevention means is installed during boring, the positional deviation of the hole can be suppressed.

It may be characterized in that the inside of the housing divided by the operation valve body is made in a communication state to have the same pressure and the operation valve body is opened.

According to this characteristic, since the annular sealing member can perform a sealing operation at the installation position in which the front end of the valve housing of the fluid control valve exceeds the opening in the neck portion while the inside of the housing divided by the operation valve body is made in a communication state at the same pressure, the opening and the open end portion can be closed at the same time in the sealed state. Thus, the fluid control valve can be accurately installed at a desired position by reducing a pressing force required for installing the fluid control valve.

It may be characterized in that a communication opening for allowing the inside of the housing divided by the operation valve body to be in a communication state is provided in the neck portion.

According to this characteristic, since the neck portion is used, the degree of freedom in designing the formation position of the communication opening is high and the communication operation in the housing divided by the operation valve body can be easily performed.

It may be characterized in that a communication opening for allowing the inside of the housing divided by the operation valve body to be in a communication state is provided in an operation valve housing of the operation valve device.

According to this characteristic, since the communication opening is provided in the operation valve housing close to the operation valve body dividing the inside of the housing, the communication path can be shortened.

It may be characterized in that a holding member holding the fluid control valve provided in the housing is attached to the opening of the neck portion in a sealed state.

According to this characteristic, the holding member holding the fluid control valve provided in the housing can be easily attached by using the opening communicating with the inside of the neck portion and the opening can be sealed by the holding member.

An installation device for a fluid control device according to the present invention is a device for installing a fluid control device in a continuous flow state, the fluid control device including at least a housing installed in a fluid pipe in a sealed state and a fluid control valve having a valve body and a valve housing insertable into a hole of the fluid pipe formed in the housing, characterized by including: an operation valve device which includes an operation valve body attached to an opening formed in a neck portion of the housing and dividing an inside of the housing in an openable and closeable manner and opened while surrounding an open end portion formed in the neck portion in a sealed state; and an annular sealing member that seals a gap between a peripheral surface of the valve housing and a peripheral surface of the neck portion at an installation position by inserting the fluid control valve communicating with the inside of the housing in a sealed state from the open end portion to the installation position in which a front end of the valve housing of the fluid control valve exceeds the opening of the neck portion while an inner part side of the open end portion and an outer part side surrounding the open end portion in a sealed state have the same pressure.

According to this characteristic, since the annular sealing member can perform a sealing operation at the installation position in which the front end of the valve housing of the fluid control valve exceeds the opening in the neck portion while the inner part side of the open end portion and the outer part side surrounding the open end portion in a sealed state have the same pressure, the opening and the open end portion can be closed at the same time in a sealed state. Accordingly, even when the fluid pipe has a relatively large diameter, the fluid control valve can be accurately installed at a desired position by reducing a pressing force required for installing the fluid control valve and a support point when inserting the valve body of the fluid control valve into the hole of the fluid pipe is secured. Accordingly, the controllability of the fluid in the pipe can be improved by improving the positional accuracy of the valve body. Further, the operation valve device which is decreased in weight and size can be easily attached and detached without requiring the operation of the valve body.

It may be characterized in that movement prevention means for preventing the movement of the housing is installed in the fluid pipe.

According to this characteristic, since it is possible to prevent the movement of the housing by the movement prevention means even when the pressure of the fluid in the pipe is applied to the housing when closing the fluid control valve, it is possible to maintain the high controllability of the fluid. Further, when the movement prevention means is installed during perforating, the positional deviation of the hole can be suppressed.

BRIEF DESCRIPTION OF DRAWINGS

FIG. 16A is a partially cross-sectional front view illustrating a modified example of a closing lid of an opening of the housing and FIG. 16B is a cross-sectional view of B-B of FIG. 16A.

FIG. 17 is a diagram illustrating movement prevention means for preventing the movement of a housing according to a second embodiment of the present invention, where

FIG. 19 is a diagram illustrating a first modified example of the movement prevention means, where

DESCRIPTION OF EMBODIMENTS

A mode for carrying out an installation method and an installation device for a fluid control device according to the present invention will be described below on the basis of embodiments.

First Embodiment

Figure 13:
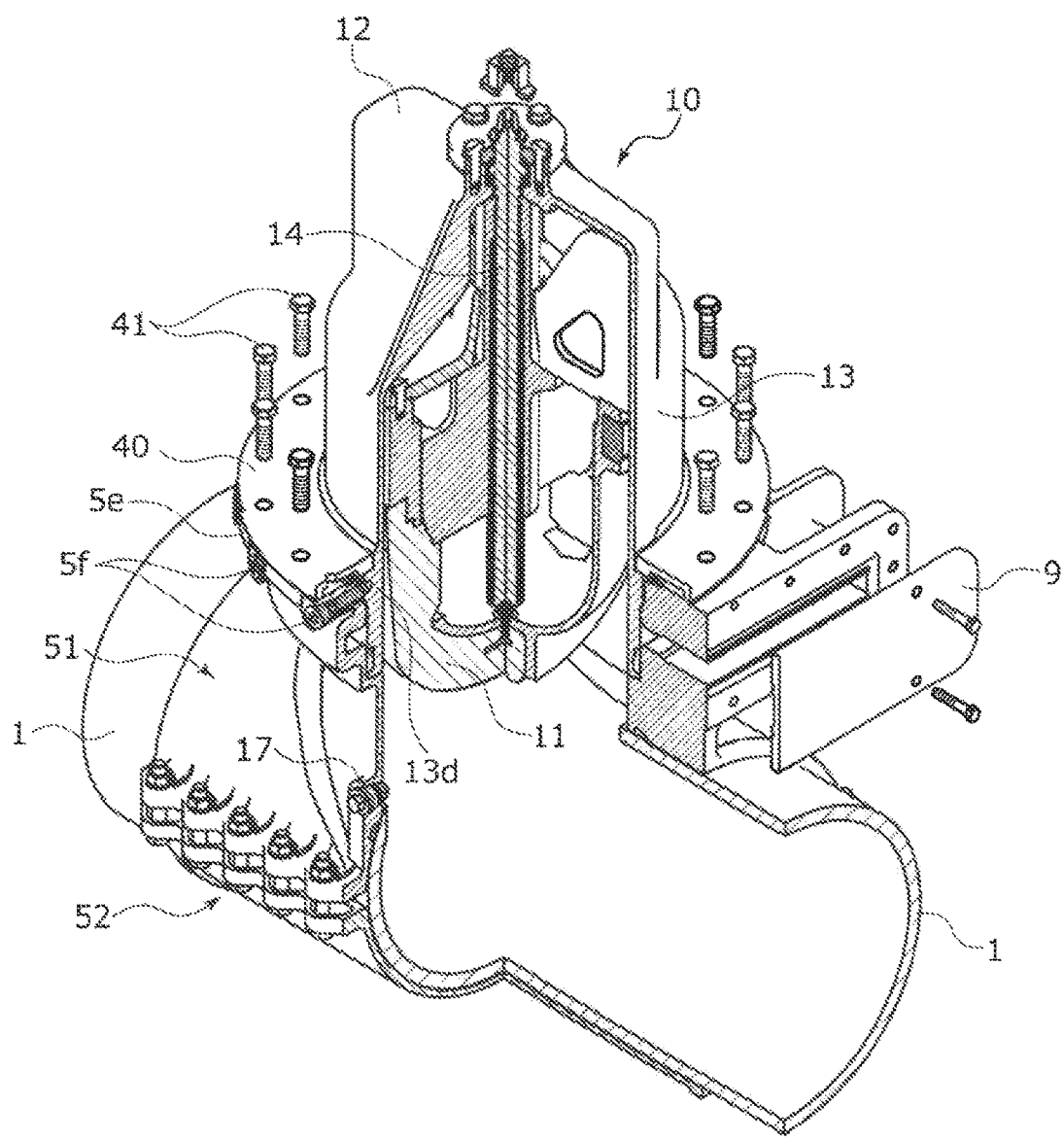
FIG. 13 is a partially cross-sectional perspective view illustrating a state in which a closing ring or the like is attached to the housing in which the fluid control valve is installed.
Figure 14:
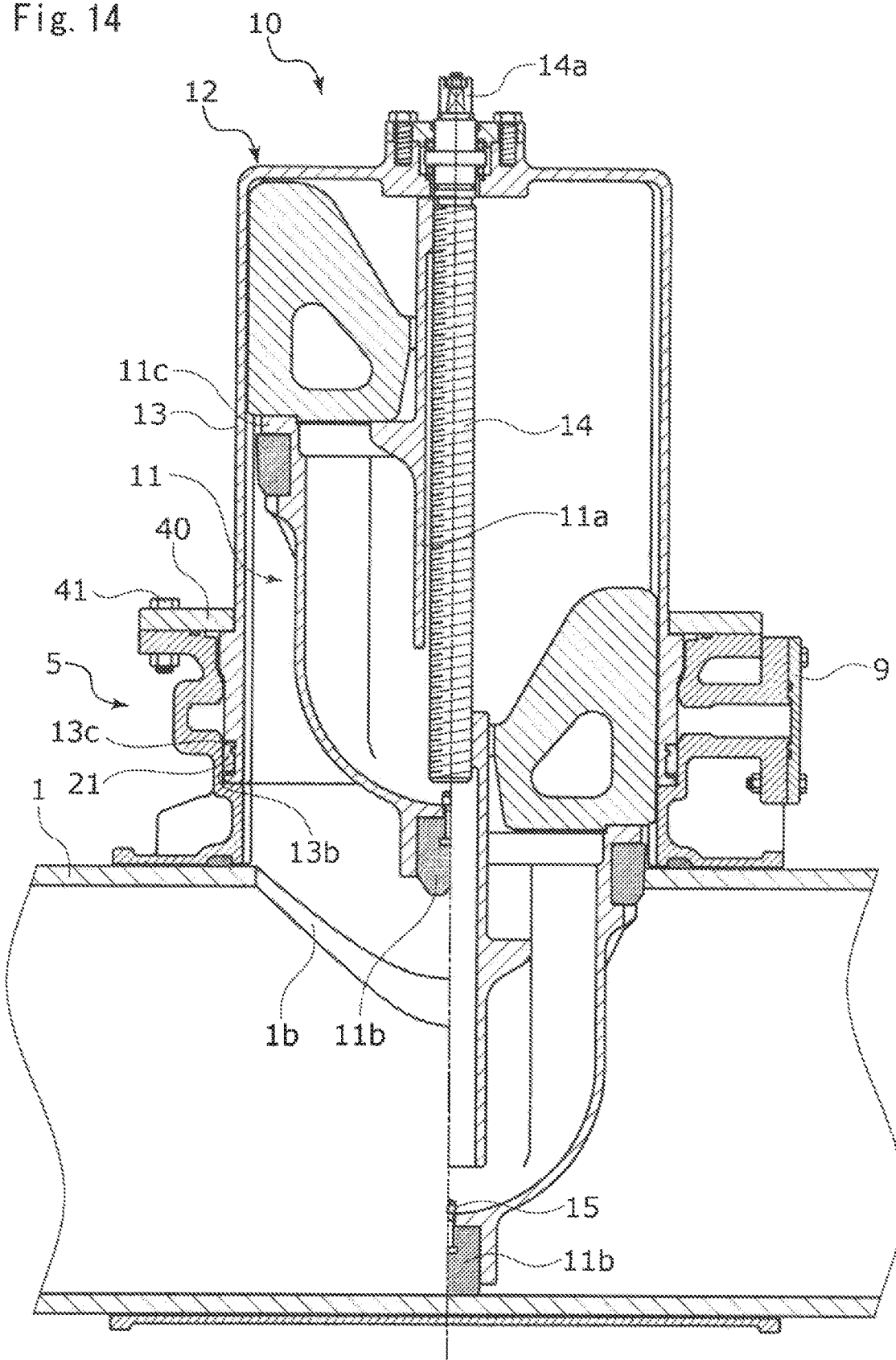
FIG. 14 is a partially cross-sectional front view illustrating the fluid control valve fixed to the housing.
Figure 15:
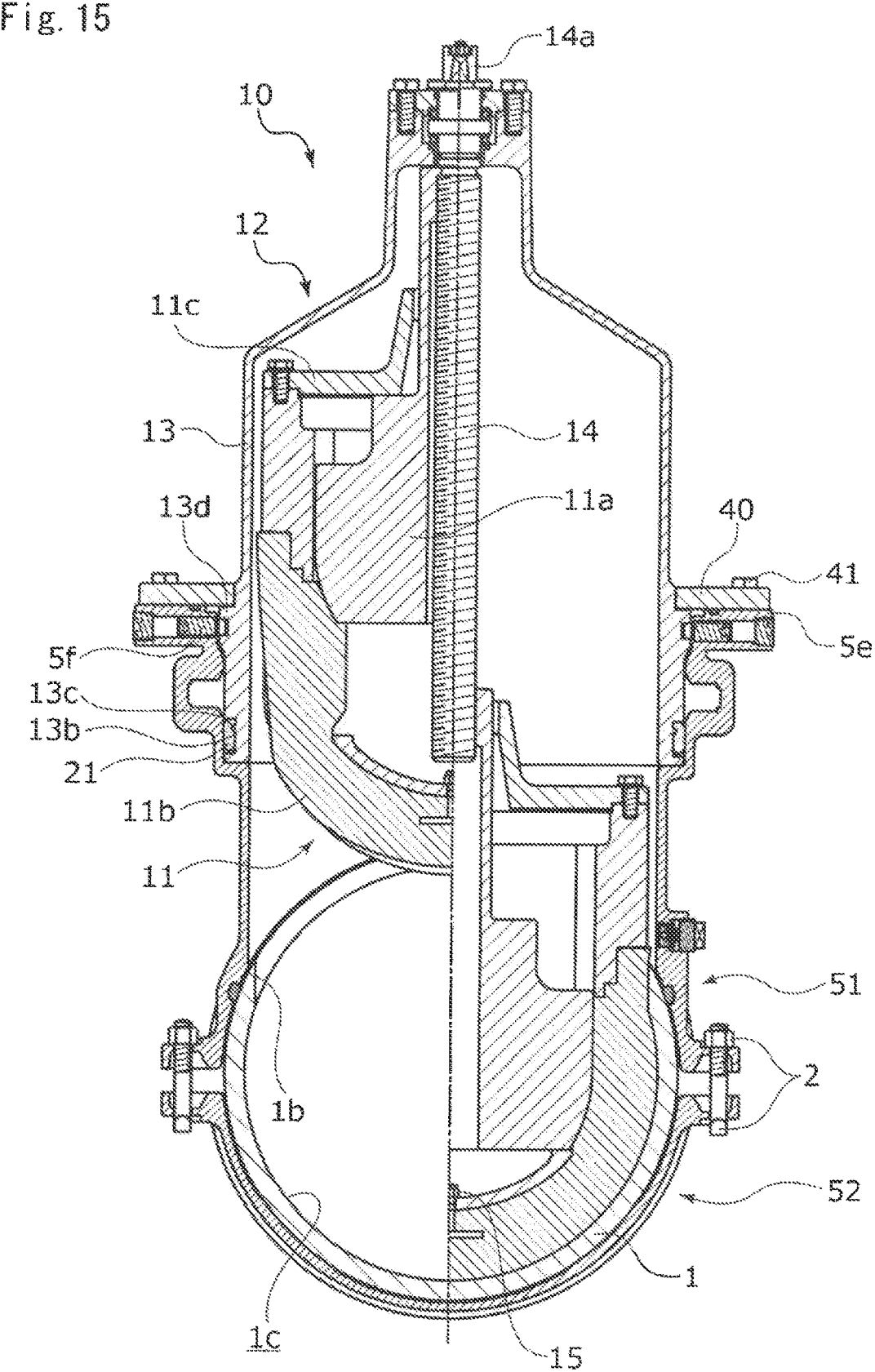
FIG. 15 is a partially cross-sectional side view illustrating the same as that of FIG. 14.

An installation method and an installation device for a fluid control device according to a first embodiment of the present invention will be described with reference to FIGS. 1 to 9A and FIGS. 10 to 15. As illustrated in FIGS. 14 and 15, a fluid control device according to the present invention mainly includes a housing 5 to which a fluid pipe 1 is externally fitted and a fluid control valve 10 which is provided in the housing 5 and controls a fluid in the pipe. In this embodiment, as the fluid control device and the installation method thereof, a series of processes until the fluid control valve 10 is installed in the housing 5 after a predetermined position of the existing fluid pipe 1 constituting a pipeline is bored in the housing 5 in a continuous flow state will be described. In addition, the fluid in the fluid pipe 1 is clean water in this embodiment, but may be, for example, industrial water, agricultural water, sewage, or a liquid other than water or a gas or a gas-liquid mixture of a gas and a liquid.

Figure 1:
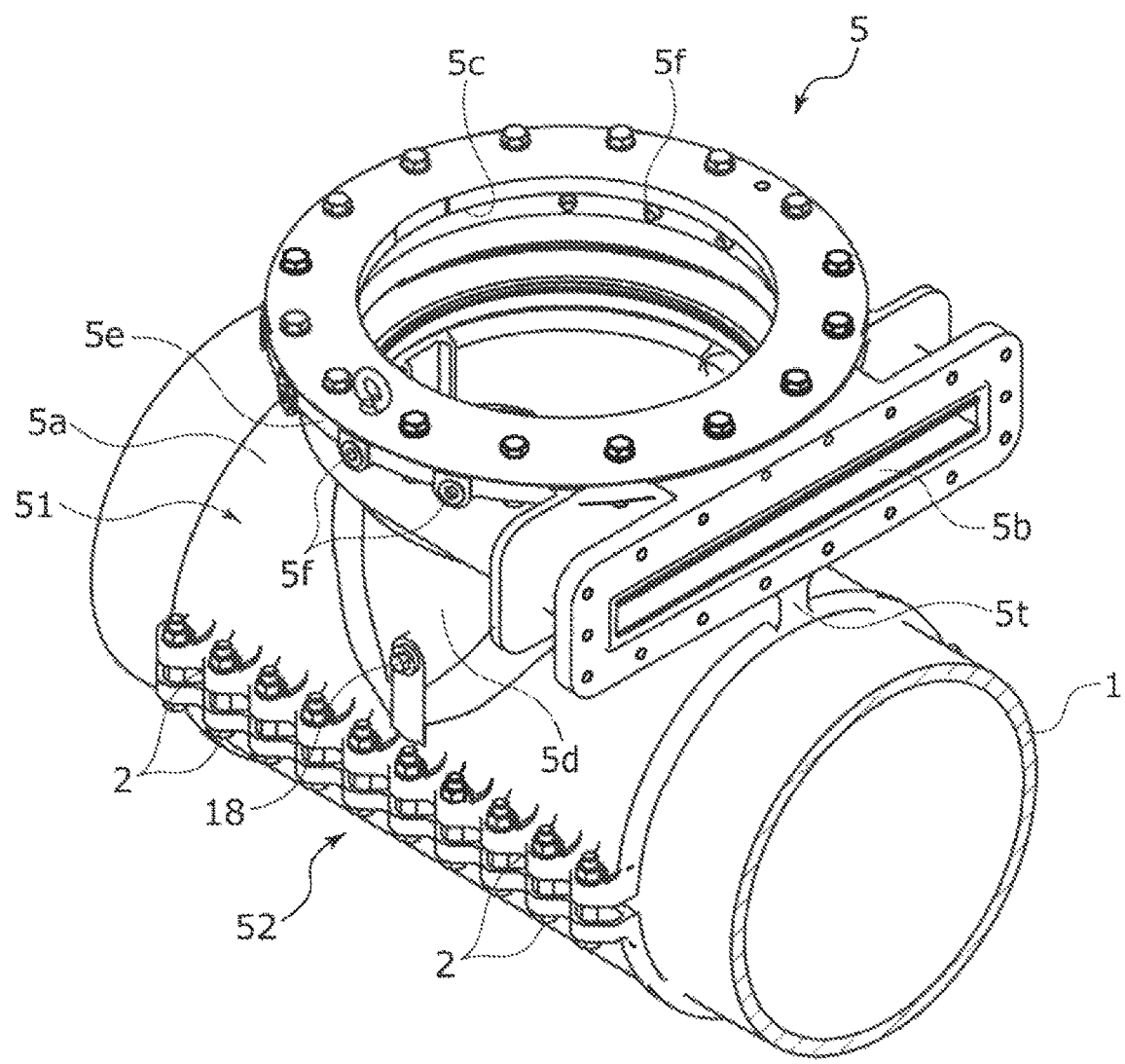
FIG. 1 is a perspective view illustrating a housing constituting a fluid control device according to a first embodiment of the present invention.
Figure 2:
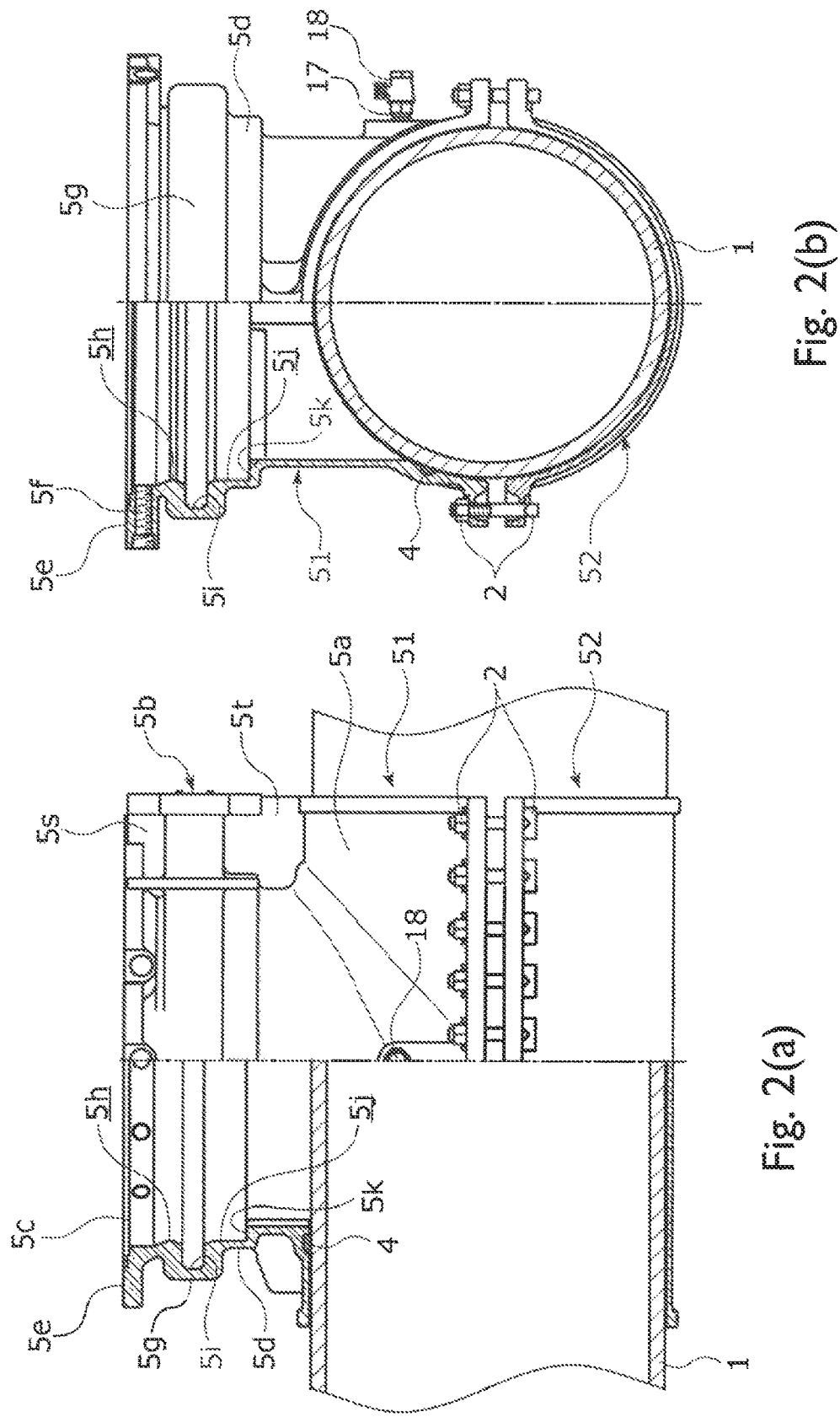
FIG. 2A is a partially cross-sectional front view illustrating the housing to which a fluid pipe is externally fitted and FIG. 2B is a side cross-sectional view thereof.

The fluid pipe 1 of this embodiment is a ductile cast iron pipe having a relatively large diameter (for example, a diameter of 300 mm or more) and is formed as a straight pipe having a substantially circular cross-section as illustrated in FIGS. 1 and 2. In this embodiment, the pipeline direction of the fluid pipe 1 is disposed in a substantially horizontal direction. Additionally, the fluid pipe according to the present invention may be made of metal such as cast iron or steel or may be made of concrete, vinyl chloride, polyethylene, polyolefin, or the like. In addition, the inner peripheral surface of the fluid pipe may be coated with an epoxy resin layer, mortar, plating, or the like or the inner peripheral surface of the fluid pipe may be coated with an appropriate material by powder coating.

Here, the fluid pipe of the present invention is not limited to a straight pipe as in this embodiment and may be formed as, for example, a special fitting pipe. Here, the special fitting pipe is a general term for a pipe having various shaped parts such as bend pipe parts, branch parts, cross parts, different diameter parts, coupling parts, short pipe parts, and drainage parts provided in at least a part thereof.

First, as illustrated in FIGS. 1 and 2, after the outer surface of the fluid pipe 1 corresponding to the attachment position of the fluid control device according to the present invention is cleaned, the housing 5 constituting the fluid control device is externally fitted in a sealed state through a seal member 4 for sealing a bored portion to be described later in the fluid pipe 1. The housing 5 has a split structure including a plurality of split bodies and includes, in this embodiment, a first split body 51 which constitutes an upper part side and a second split body 52 which constitutes a lower part side. In addition, the split structure of the housing 5 is not limited to this embodiment, but may be divided, for example, in the horizontal direction or may be divided into a predetermined number of three or more. Further, the split housings are joined to each other in a sealed state by a fastening member 2 including a bolt and a nut in this embodiment, but the present invention is not limited thereto. For example, the split housings may be bonded to each other by welding.

Figure 3:
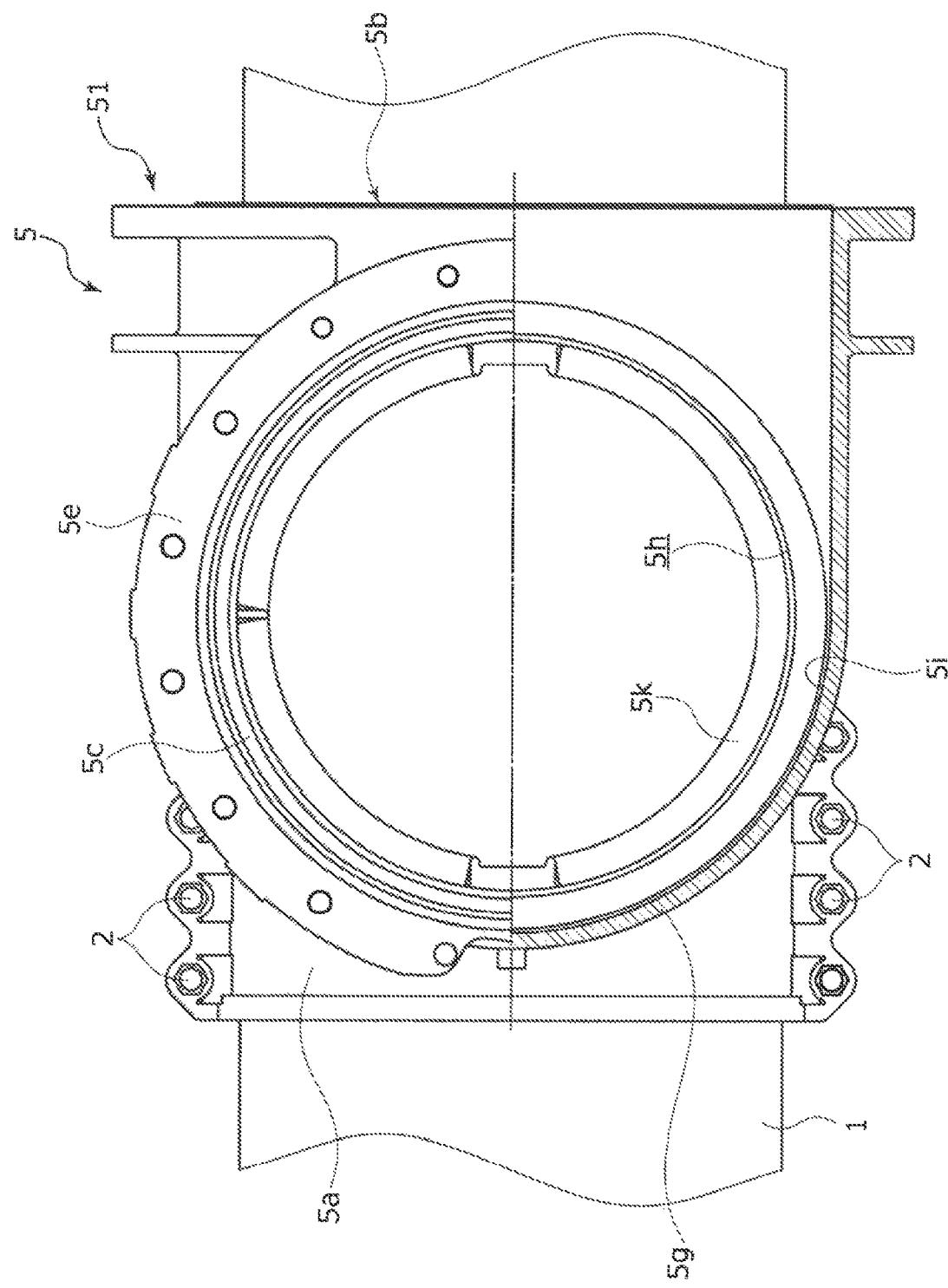
FIG. 3 is a plan view of the same housing as that of FIG. 2.

As illustrated in FIGS. 1 to 3, the first split body 51 of the housing 5 includes a pipeline housing portion 5a which is provided along the fluid pipe 1 so as to be extended in the pipeline direction and a cylindrical neck portion 5d which is provided at the substantial center of the pipeline housing portion 5a so as to be branched and extended in the up and down direction and includes an open end portion 5c opened upward and an opening 5b opened laterally and is formed in an inverse T shape when viewed from the front side.

Further, the open end portion 5c of the neck portion 5d includes an integrated flange portion 5e which protrude outward in the radial direction in the pipeline direction of the fluid pipe 1 and a plurality of push bolts 5f and 5f which are formed so as to be insertable through a plurality of through-holes formed in the circumferential direction of the flange portion 5e.

This neck portion 5d includes a thick pipe portion 5g which is provided on the cylindrical peripheral side portion so that the outer surface protrudes in the radial direction and the thick pipe portion 5g is provided with the opening 5b which is opened toward one side in the pipeline direction of the fluid pipe 1. As illustrated in FIG. 1, the opening 5b is opened in a horizontally long substantially rectangular shape in a side view and is formed so that an operation valve body 31 of an operation valve device 3 is insertable therethrough as will be described later.

Further, as illustrated in FIGS. 1 and 2, in the first split body 51 of the housing 5, a rib 5s is extended in the up and down direction over the upper flange portion 5e and the substantial center portion of the opening 5b in a side view and a rib 5t is extended in the up and down direction over the lower pipeline housing portion 5a and the substantial center portion of the opening 5b in a side view.

Further, as illustrated in FIG. 2A, the inner peripheral portion of the neck portion 5d is provided with an inner peripheral surface 5h which is formed as a substantially circular curved surface in a plan view, a recessed portion 5i which is formed at the same height position as that of the opening 5b so as to be recessed outward in the radial direction, an inner peripheral surface 5j which is formed below the recessed portion 5i and has a diameter slightly smaller than the upper inner peripheral surface 5h, and a step portion 5k which is connected to the lower end of the inner peripheral surface 5j and protrudes inward in the radial direction.

Further, as illustrated in FIGS. 2A and 2B, the lower portion of the neck portion 5d is provided with a communication opening 17 which penetrates the neck portion 5d from the inside to the outside and an opening and closing plug 18 is usually screwed into the communication opening 17.

Figure 4:
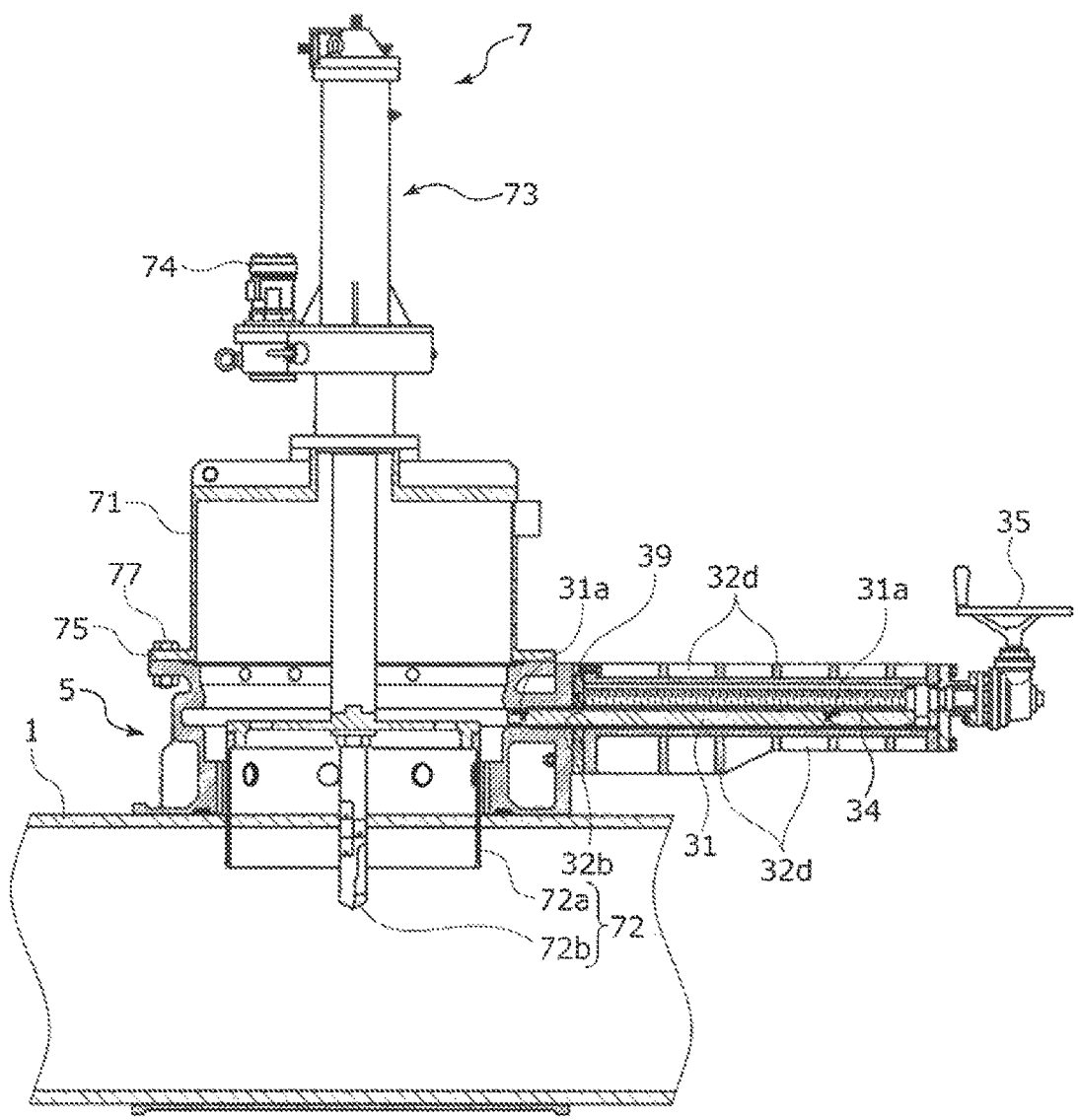
FIG. 4 is a partially cross-sectional front view illustrating an operation valve device assembled to the housing.
Figure 5:
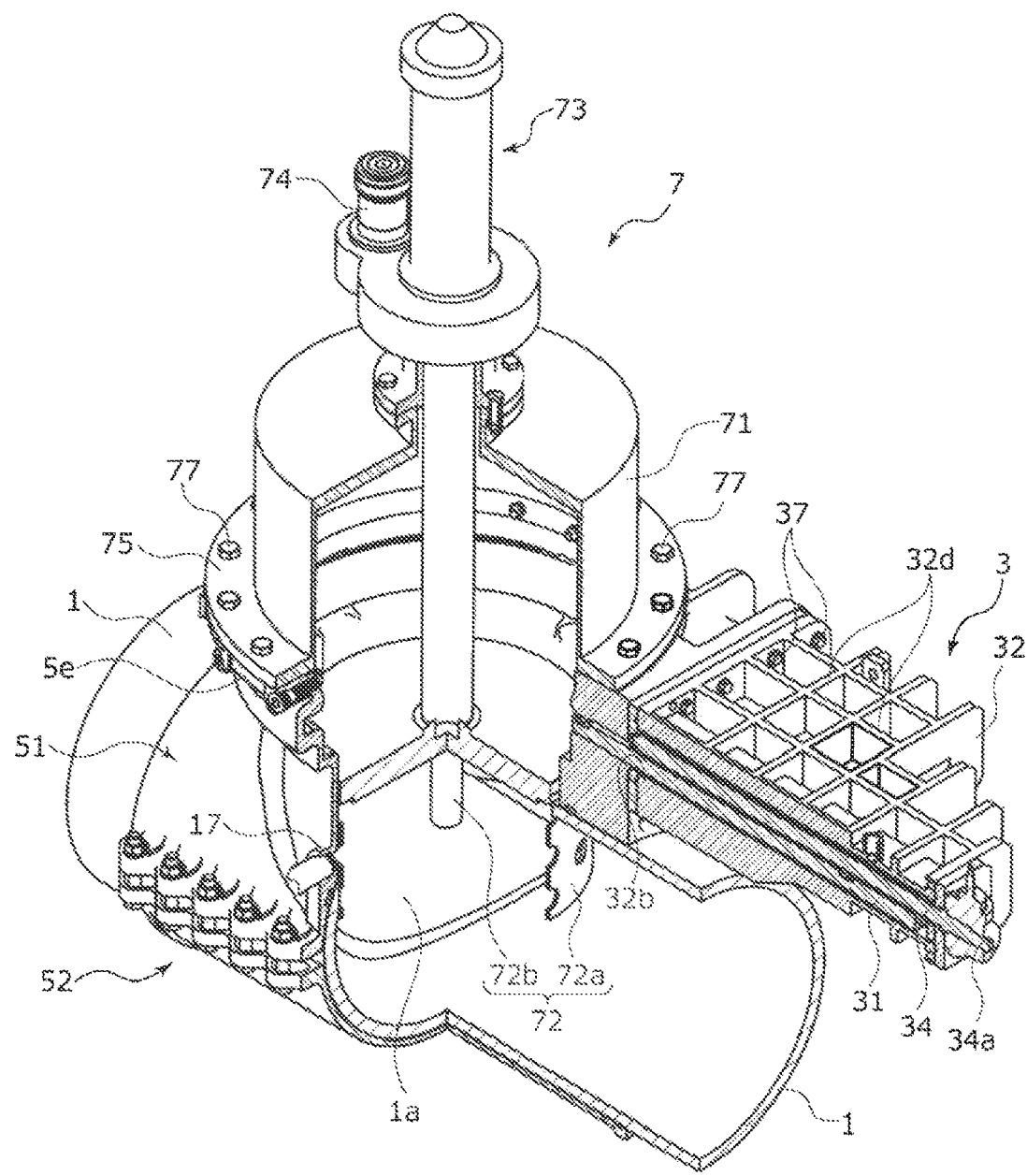
FIG. 5 is a partially cross-sectional perspective view illustrating a state in which the fluid pipe is bored by a boring machine.

Next, as illustrated in FIGS. 4 and 5, the operation valve device 3 is connected to the opening 5b of the neck portion 5d in a sealed state. The operation valve device 3 includes an operation valve body 31 which slides in the housing 5 so as to be openable and closeable and an accommodation member 32 which is an operation valve housing including an accommodation interior 32a accommodating the operation valve body 31 so as to be slidable in the horizontal direction and an opening portion 32b formed by opening one side end.

The accommodation member 32 includes a shaft member 34 that is axially supported so as to be rotatable and immovable forward and backward and is extended in the horizontal direction, the operation valve body 31 is screwed into the shaft member 34, and an operation member 35 attached to a front end portion 34a of the shaft member 34 protruding toward the outside of the accommodation member 32 is rotated so that the operation valve body 31 is slidable with respect to the accommodation member 32. Further, the upper and lower surfaces of the accommodation member 32 are provided with a rib 32d which is formed in a lattice shape to be extended in the up and down direction.

Further, an endless seal member 31a covers along the edge portions of the upper and lower surfaces of the operation valve body 31 and the inside of the housing 5 is closed in a sealed state by the seal member 31a.

Regarding the specific attachment procedure of the operation valve device 3, the accommodation member 32 is first disposed on the outer surface of the neck portion 5d at a position in which the opening portion 32b communicates with the opening 5b of the neck portion 5d.

Next, the accommodation member 32 is fastened to the neck portion 5d. In this embodiment, the accommodation member is fastened by threading attachment bolts 37 over a plurality of through-holes formed so as to surround the opening portion 32b of the accommodation member 32 and a plurality of female screw holes formed so as to surround the opening 5b of the neck portion 5d. That is, in this embodiment, the attachment bolts 37 constitute the fastening member. In this way, since the accommodation member 32 is connected to the neck portion 5d by the attachment bolts 37 constituting the fastening member, the accommodation member is positioned at a position in which the opening portion 32b communicates with the opening 5b of the neck portion 5d and the fastening operation can be easily performed. Additionally, a bolt and a nut may be provided as the fastening member.

Further, in the accommodation member 32, the seal member 39 is disposed so as to surround the periphery of the opening portion 32b and the seal member 39 is in close contact with the peripheral edge of the opening 5b by the fastening of the fastening member so that the opening 5b and the opening portion 32b are sealed. In this way, since the operation valve device 3 is provided in the opening 5b provided in the neck portion 5d, an attachment position of an inserter 60 or a boring machine 7 to be described later can be as close as possible to the fluid pipe 1, the extension stroke in which the boring machine 7 or the inserter 60 approaches the fluid pipe 1 can be shortened. As a result, the boring machine 7 or the inserter 60 can be made smaller, lighter, and cost-effective (see FIGS. 5 and 7).

Next, as illustrated in FIG. 5, the boring machine 7 is connected to the open end portion 5c of the neck portion 5d in a sealed state. The boring machine 7 mainly includes an attachment flange cylinder 71, a cutter 72 which bores the fluid pipe 1, a drive motor 74 which rotates the cutter 72 in the attachment flange cylinder 71, and an advancing and retracting mechanism 73 which advances and retracts the cutter 72 in the up and down direction. The cutter 72 includes a hole saw 72a which is formed in a bottomed cylinder having a smaller diameter than the fluid pipe 1 and has a cutting blade formed in the tip in the circumferential direction and a center drill 72b which is disposed coaxially with the rotation shaft of the hole saw 72a and protrudes forward more than the cutting blade. In addition, the cutter 72 is disposed concentrically with the open end portion 5c of the neck portion 5d of the housing 5, is inserted from the side of the open end portion 5c into the neck portion 5d of the housing 5, and is able to advance to a position penetrating at least the pipe wall of the pipe top portion of the fluid pipe 1.

When describing the attachment procedure of the boring machine 7, a flange portion 75 formed in the front end of the attachment flange cylinder 71 is fastened to the flange portion 5e of the open end portion 5c of the neck portion 5d by a plurality of fastening members 77 in the circumferential direction.

Further, a seal member is provided between the upper end surface of the flange portion 5e of the neck portion 5d and the lower end surface of the flange portion 75 of the attachment flange cylinder 71 and the seal member is in close contact with the flange portion 75 of the attachment flange cylinder 71 so that the attachment flange cylinder 71 of the boring machine 7 and the neck portion 5d of the housing 5 are sealed in a fastened state.

Additionally, the connection operation of the operation valve device 3 with respect to the opening 5b of the neck portion 5d and the connection operation of the boring machine 7 with respect to the open end portion 5c of the neck portion 5d are not essentially limited to the above-described procedure and the connection operation of the operation valve device 3 may be performed after performing the connection operation of the boring machine 7 or these connection operations may be performed in parallel at the same time.

Next, when describing the boring process of the fluid pipe 1 using the boring machine 7 as illustrated in FIG. 5, the cutter 72 is rotated by the drive motor 74 of the boring machine 7 and the cutter 72 is advanced downward by the advancing and retracting mechanism 73 so as to bore the pipe wall of the pipe top portion of the fluid pipe 1 in a continuous flow state while the operation valve body 31 of the operation valve device 3 is first disposed in the accommodation interior 32a of the accommodation member 32 and the inside of the housing 5 is opened.

At this time, for example, a ball valve (not illustrated) formed in the communication opening 17 formed on the side surface of the neck portion 5d as an opening communicating with the inside of the housing 5 is opened so that chips generated when boring are discharged to the outside along with a fluid. Further, as will be described later, the communication opening 17 is used as a bypass for filling water when the fluid control valve 10 is operated. Further, the ball valve is removed in a continuous flow state after drilling and is sealed by the opening and closing plug 18 illustrated in FIG. 15.

Further, as illustrated in FIG. 5, when the fluid pipe 1 is cut by the cutter 72, a cut piece 1a of the pipe top portion separated from the fluid pipe 1 is held in the hole saw 72a. Then, the cutter 72 is pulled together with the cut piece 1a in the attachment flange cylinder 71 so that the inside of the housing 5 is closed by the operation valve body 31 of the operation valve device 3 and the boring operation of the fluid pipe 1 is completed. At this time, since the attachment position of the boring machine 7 is near the fluid pipe 1, the boring machine 7 is positioned concentrically with respect to the housing 5 as much as possible. Accordingly, even when the parallelism of the attachment flange of the boring machine 7 and the connection surface of the attachment flange cylinder 71 deviates, the influence on the bored portion is minimized and the boring deviation is suppressed.

Furthermore, in this embodiment, since the fluid pipe 1 is formed to have a relatively large diameter, the area of the operation valve body 31 closing the inside of the housing 5 is wide and the pressing force of the fluid in the pipe acting on the operation valve body 31 is large. However, as described above, since the structure strength of the housing 5 and the accommodation member 32 can be increased by the ribs 5s and 5t provided in the housing 5 and the rib 32d provided in the accommodation member 32 corresponding to the operation valve housing, deformation such as bending due to the pressing force of the fluid in the pipe is prevented.

Next, the boring machine 7 is removed while the inside of the housing 5 is closed in a sealed state by the operation valve body 31 of the operation valve device 3 and a discharger 8 for discharging chips generated during drilling is connected to the open end portion 5c of the neck portion 5d instead of the boring machine 7.

Figure 6:
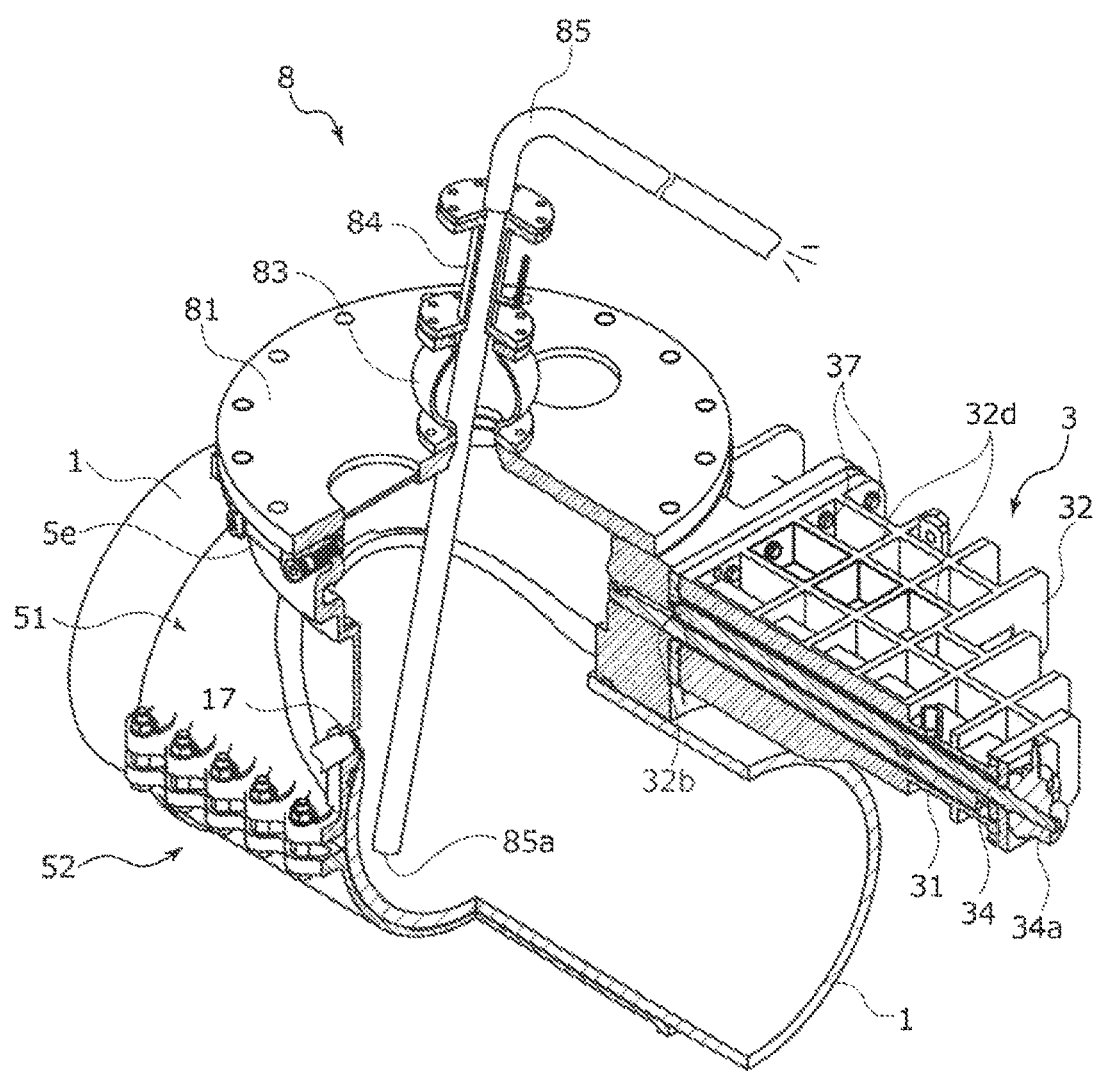
FIG. 6 is a partially cross-sectional perspective view illustrating a state in which chips are discharged by a discharger.

As illustrated in FIG. 6, the discharger 8 mainly includes an attachment flange plate 81 which is fixed and attached to the open end portion 5c of the neck portion 5d and is opened at the center thereof, a flexible cylinder 83 which is connected to the center opening of the attachment flange plate 81 and is formed as an elastic member, an operation cylinder 84 which is connected to the upper end of the flexible cylinder 83, and a discharge pipe 85 which is inserted through the attachment flange plate 81, the flexible cylinder 83, and the operation cylinder 84 in a sealed state. An opening and closing valve (not illustrated) which protrudes toward the outside of the operation cylinder 84 and opens and closes the inside of the discharge pipe 85 is connected to the rear end side of the discharge pipe 85.

Additionally, the attachment flange plate 81 of the discharger 8 and the open end portion 5c of the neck portion 5d are fastened to each other by a plurality of fastening members (not illustrated) in the circumferential direction similarly to the attachment flange cylinder 71 of the boring machine 7 and the open end portion 5c of the neck portion 5d.

Next, when describing a chip discharging process of the discharger 8, chips in the fluid pipe 1 or the housing 5 can be discharged together with the fluid by opening the opening and closing valve (not illustrated) connected to the rear end side of the discharge pipe 85. At this time, since a suction port 85a of a front end of the discharge pipe 85 can be moved to a desired position in the housing 5 by gripping the operation cylinder 84 coaxially fitted to the discharge pipe 85 and freely inclining the operation cylinder with respect to the attachment flange plate 81 using the elastic deformation of the flexible cylinder 83, almost the entire amount of chips can be discharged even when chips are scattered in every corner of the housing 5.

Next, the discharger 8 is removed while the inside of the housing 5 is closed by the operation valve body 31 of the operation valve device 3 and the fluid control valve 10 for controlling a fluid in the pipe is connected to the open end portion 5c of the neck portion 5d instead of the discharger 8.

Figure 7:
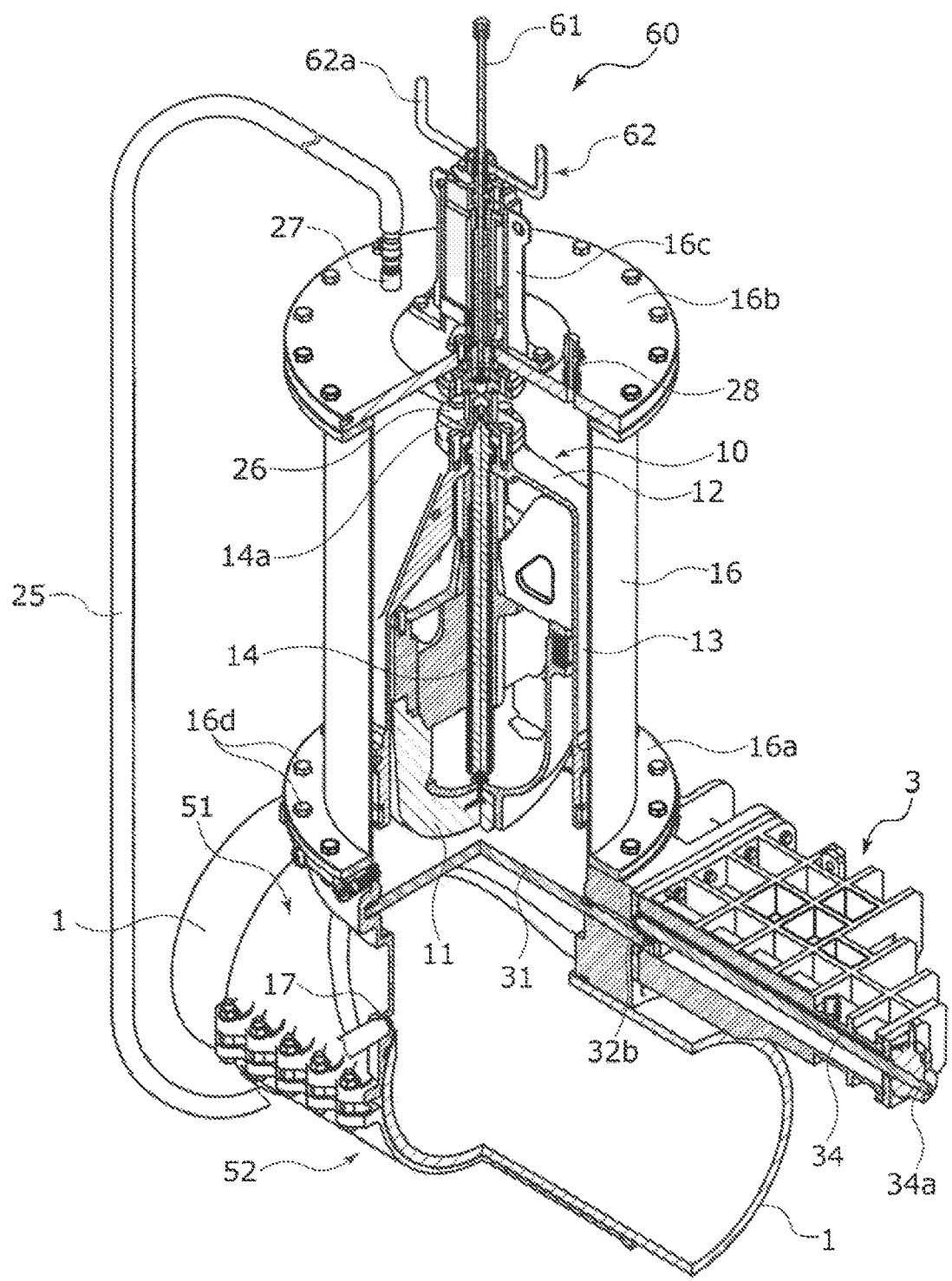
FIG. 7 is a partially cross-sectional perspective view illustrating a communication state in the housing partitioned by an operation valve body.

Prior to the attachment of the fluid control valve 10, as illustrated in FIGS. 7 and 8, a flange portion 16a which is formed at a lower end of an accommodation cylinder 16 accommodating the fluid control valve 10 to be movable in the up and down direction is connected to the open end portion 5c of the neck portion 5d in a sealed state by a plurality of fastening members 16d in the circumferential direction. The accommodation cylinder 16 is formed as a bottomed cylinder in which a lower end is opened and an upper portion is closed by a closing lid 16b having a through-hole formed at the center thereof. Further, the closing lid 16b is provided with a communication opening 27 which allows the inside and the outside of the accommodation cylinder 16 to communicate with each other and a ball valve is usually screwed to the communication opening 27.

The inserter 60 which is assembled so that the fluid control valve 10 is movable with the outside operation in the up and down direction of the accommodation cylinder 16 and is attachable and detachable is provided in the accommodation cylinder 16 as insertion means for inserting the fluid control valve 10 into the housing 5. The inserter 60 is extended to bore the center of the upper portion of the accommodation cylinder 16 in the up and down direction and mainly includes an extension bar 61, an operation bar 62, and an insertion cylinder 63 in this order from the center side.

More specifically, as illustrated in FIG. 12A, the extension bar 61 is formed such that the lower end is screwed into an attachment jig 26 provided in the upper end of the valve housing 12 of the fluid control valve 10 and the upper end is extended upward more than the accommodation cylinder 16. The operation bar 62 for fitting the extension bar 61 to the outside thereof is axially supported to an upper cylinder portion 16c constituting the accommodation cylinder 16 and covering the through-hole of the closing lid 16b so as to be rotatable and immovable in the axial direction and the upper end thereof is provided with a gripper 62a for a rotation operation. Further, the insertion cylinder 63 for fitting the operation bar 62 to the outside is axially supported by the upper cylinder portion 16c so as not to be rotatable and movable in the axial direction and a lower end portion 63a of it is sandwiched between the attachment jig 26 and a flange 61a of the extension bar 61 in the up and down direction and includes a female screw portion 63b which is screwed into a male screw portion 62b of the operation bar 62.

Figures 8A, 8B:
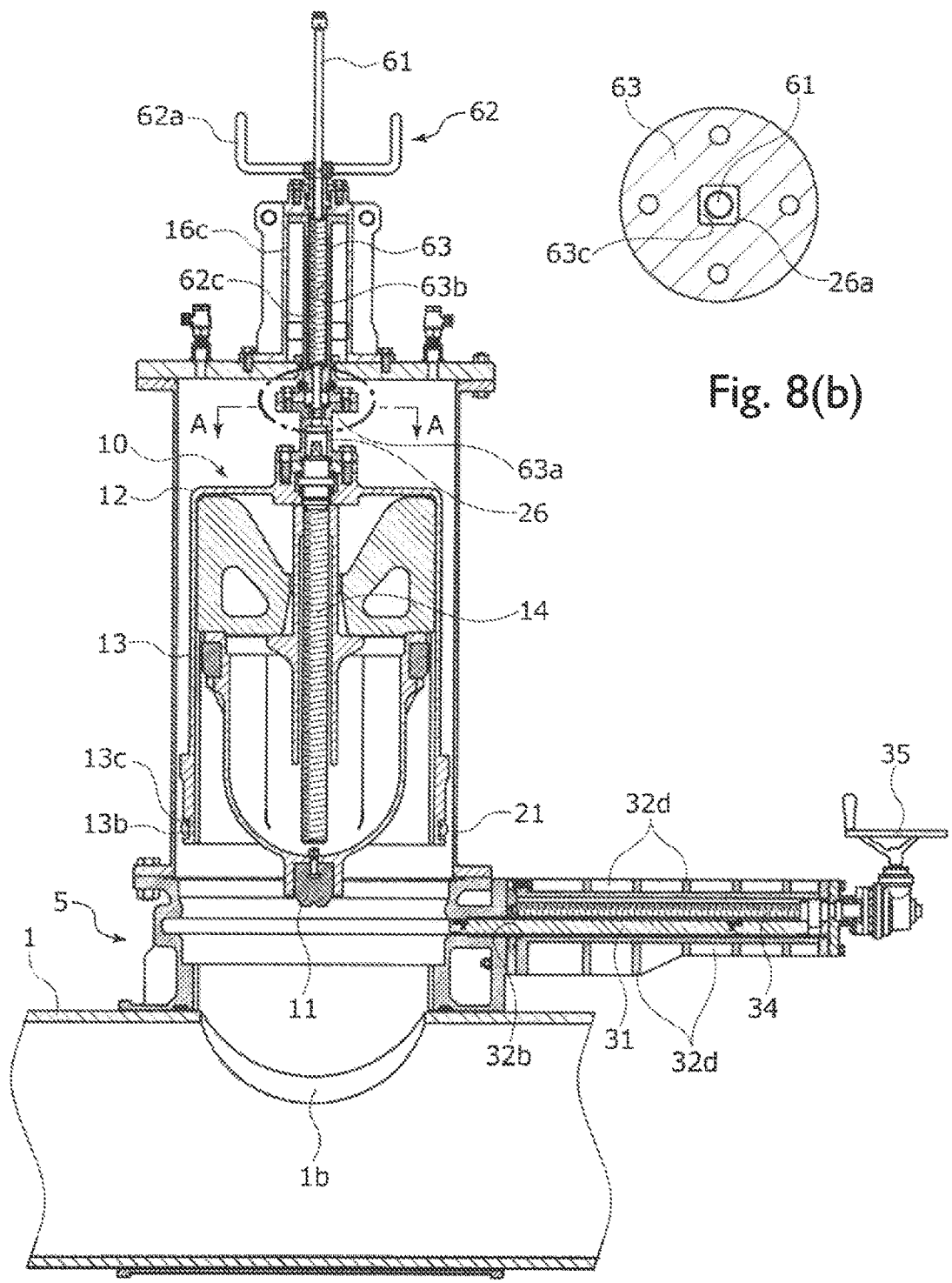
FIG. 8A is a partially cross-sectional front view illustrating a state in which a fluid control valve is inserted by an inserter and FIG. 8B is a cross-sectional view of A-A of FIG. 8A.

Further, as illustrated in FIG. 8B, the lower end portion 63a of the insertion cylinder 63 is provided with a through-hole 63c having a substantially rectangular shape in a plan view and a protruding end portion 26a of the attachment jig 26 protruding in a substantially rectangular shape in a plan view so as to compensate the through-hole 63c is internally fitted to the through-hole 63c. With such a configuration, the circumferential movement of the fluid control valve 10 to which the attachment jig 26 is attached with respect to the insertion cylinder 63 is regulated. Additionally, the shapes of the through-hole 63c of the insertion cylinder 63 and the protruding end portion 26a of the attachment jig 26 compensating the through-hole in a plan view are not limited to a substantially rectangular shape and may be a non-circular shape such as a rectangular shape, an elliptical shape, or an oval shape.

As illustrated in FIG. 7, the fluid control valve 10 mainly includes a plug 11 (a valve body) which passes through a bored hole 1b of the fluid pipe 1 and moves upward and downward so that the inside of the pipe is openable and closeable and a valve housing 12 which accommodates the plug 11 to be movable in the up and down direction and has a peripheral side portion 13 of which a lower end is opened. The valve housing 12 includes a shaft member 14 that is extended in the up and down direction while being axially supported so as to be rotatable and immovable forward or backward and the plug 11 is screwed into the shaft member 14. When an operation portion 14a of the upper end of the shaft member 14 protruding toward the outside of the valve housing 12 is rotated, the plug 11 is movable up and down with respect to the valve housing 12.

More specifically, the plug 11 mainly includes, as illustrated in FIG. 15, a female screw piece 11a which is screwed into the shaft member 14 and has a female screw, a plug 11b which is made of an elastic material, a plug body 11c which engages with the female screw piece 11a to be operated in a following manner and is made of a rigid body such as a metal piece or plastic, and a fixing member 15 that is formed as a bolt and a nut integrally molded in the plug 11b by vulcanization or the like and connects the plug 11b to the plug body 11c. The plug 11 moves into the pipe through the hole 1b of the lower fluid pipe 1 with the rotation of the shaft member 14 and the plug 11b is in close contact with the hole 1b and the inner peripheral surface 1c of the fluid pipe 1 over the entire circumference so that the flow path in the pipe is completely blocked or the flow path in the pipe is partially blocked in response to the movement amount of the plug body 11c so as to control the flow rate. Additionally, the plug 11b is made of rubber having different harnesses at the upper peripheral portion that stops water in the hole 1b and the lower U-shaped portion that stops water on the inner peripheral surface 1c of the fluid pipe 1 and is preferably integrally molded and attached to the fixing member 15 by adhesion or vulcanization. With such a configuration, the plug 11b can be easily inserted while preventing the U-shaped portion from being washed away by the flow velocity. In particular, it is preferable that the peripheral portion is soft, the U-shaped portion is designed to be hard, and these are integrally formed. The female screw piece 11a first moves downward together with the plug 11b and the plug body 11c. However, when the plug 11b contacts the peripheral bottom portion in the pipe, the female screw piece 11a largely moves downward with respect to the plug 11b and the plug body 11c and the blades on both sides of the plug 11b are expanded outward in the radial direction so as to assist the water stopping operation. Further, the fixing member 15 forms a core portion in the plug 11b which is an elastic body so as to prevent the U-shaped portion from being washed away by the flow velocity. Additionally, the plug 11b may be vulcanized or vulcanization-coated on the plug body 11c to cover the entire part thereof.

Further, in the valve housing 12 of the fluid control valve 10, a concave portion 13b is formed in the entire circumference of the outer peripheral surface of the lower end side of the peripheral side portion 13 and a sealing member 21 is provided in the concave portion 13b.

Figure 9A:
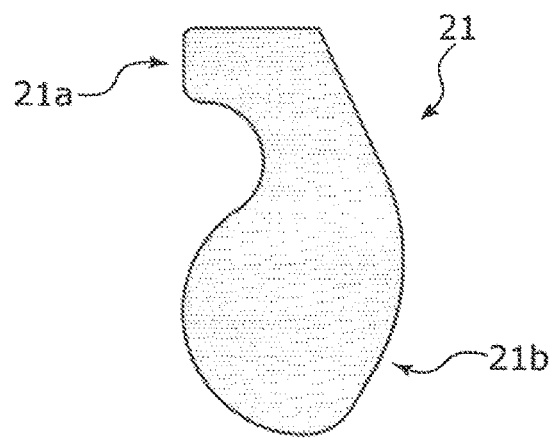
FIG. 9A is a cross-sectional view of a sealing member of a first embodiment.

As illustrated in FIG. 9A, the sealing member 21 of this embodiment is formed as an annular integrally elastic material. The sealing member 21 includes a base end side holding portion 21a which is held between a bulging portion 13c formed on the bottom surface of the concave portion 13b and an inner wall of the concave portion 13b and a deformed portion 21b which is connected to the holding portion 21a and allows the elastic deformation and the sealing member 21 is formed so that the outermost diameter of the deformed portion 21b is larger than the inner diameter of the neck portion 5d in a natural state before the elastic deformation. Further, the deformed portion 21b of this embodiment is formed in a substantially bulbous cross-sectional shape that smoothly bulges inward and outward in the radial direction and toward the front end. With such a configuration, since the deformed portion 23b receives the pressure of the fluid evenly on almost the entire outer surface thereof and elastically deforms into a gentle curved surface having a large radius of curvature, a wide sealing surface with the inner peripheral surface of the neck portion can be obtained and the valve housing can be easily inserted.

Next, when describing the installation process of the fluid control valve 10, first, as illustrated in FIG. 7, the communication opening 17 provided in the neck portion 5d of the housing 5 lower than the operation valve body 31 communicates with the communication opening 27 provided in the closing lid of the accommodation cylinder 16 above the operation valve body 31 by a connection hose 25 while the accommodation cylinder 16 accommodating the fluid control valve 10 therein is connected to the open end portion 5c of the housing 5 in a sealed state as described above before opening the operation valve body 31. With such a configuration, the fluid in the fluid pipe 1 is gradually introduced into the accommodation cylinder 16 through the communication opening 17, the connection hose 25, and the communication opening 27 by the fluid pressure.

In this way, when the fluid in the fluid pipe 1 is introduced into the accommodation cylinder 16, the pressure in the accommodation cylinder 16 and the pressure in the fluid pipe 1 can be adjusted to the same pressure before opening the operation valve body 31. Further, the pressure may be adjusted to the same pressure by the communication with the connection hose 25 after the closing lid 16b is opened to fill water while the accommodation cylinder 16 is connected to the open end portion 5c of the housing 5 in a sealed state or the communication opening 27 is used to fill water while the accommodation cylinder 16 is connected in a sealed state.

Further, since the neck portion 5d of the housing 5 is used as the formation position of the communication opening 17, the degree of freedom in designing the formation position of the communication opening 17 is high and the communication operation in the housing 5 divided by the operation valve body 31 can be easily performed.

Additionally, any one or both of the communication opening 17 below the operation valve body 31 and the communication opening 27 above the operation valve body 31 may be provided to the accommodation member 32 of the operation valve device 3 or in parallel. In this way, when the communication opening is provided in the operation valve housing closer to the operation valve body 31 dividing the inside of the housing 5, the communication path can be shortened.

Further, at this time, when an air vent hole 28 provided in the closing lid 16b of the accommodation cylinder 16 so as to be openable and closeable is opened, air staying in the accommodation cylinder 16 is discharged to the outside. With such a configuration, since air in the housing 5 can be discharged when performing the communication operation in the housing 5 divided by the operation valve body 31, the housing 5 can be filled with the fluid in the pipe.

Next, as illustrated in FIG. 8, the operation valve body 31 is opened and the fluid control valve 10 in the accommodation cylinder 16 is installed toward the lower housing 5. More specifically, when the gripper 62a of the operation bar 62 of the inserter 60 is rotated in the forward rotation direction, the insertion cylinder 63 screwed to the operation bar 62 moves downward. As the insertion cylinder 63 moves downward, a downward pressing force is applied to the fluid control valve 10 through the attachment jig 26 and the fluid control valve 10 is gradually moved downward in the neck portion 5d. Additionally, the extension bar 61 screwed to the attachment jig 26 also moves downward in accordance with the movement of the fluid control valve 10.

At this time, as described above, since there is no pressure difference in the accommodation cylinder 16 by adjusting the pressure to be the same as the pressure in the fluid pipe 1, the fluid control valve 10 can be pressed with a small pressing force. Further, the pressing force may be assisted, for example, in such a manner that a hydraulic pump is connected to the communication opening 27 and a high pressure is formed in the accommodation cylinder 16 (the outside of the open end portion 5c).

Figure 10:
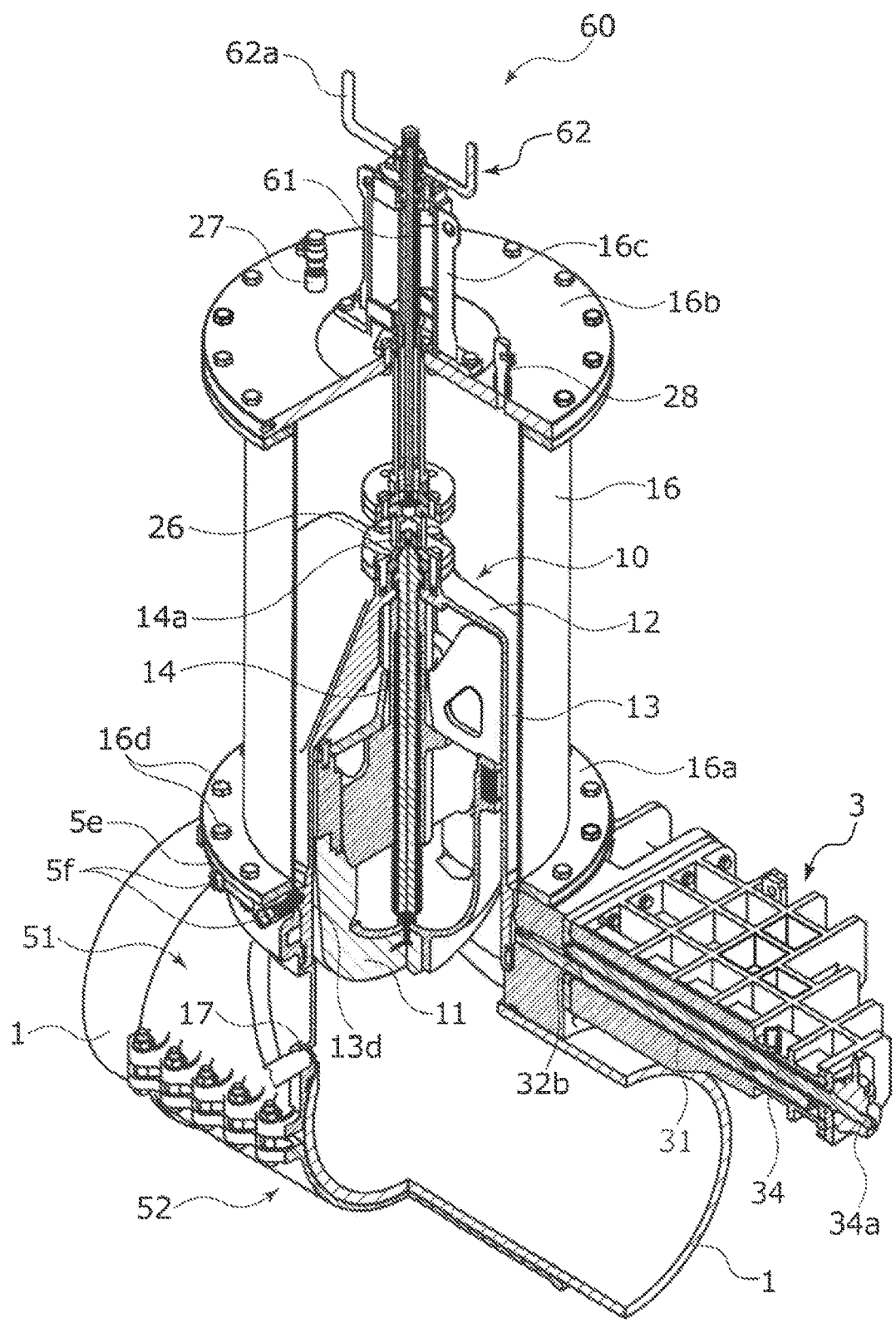
FIG. 10 is a partially cross-sectional perspective view illustrating a state in which the fluid control valve is completely installed by the inserter.
Figure 11:
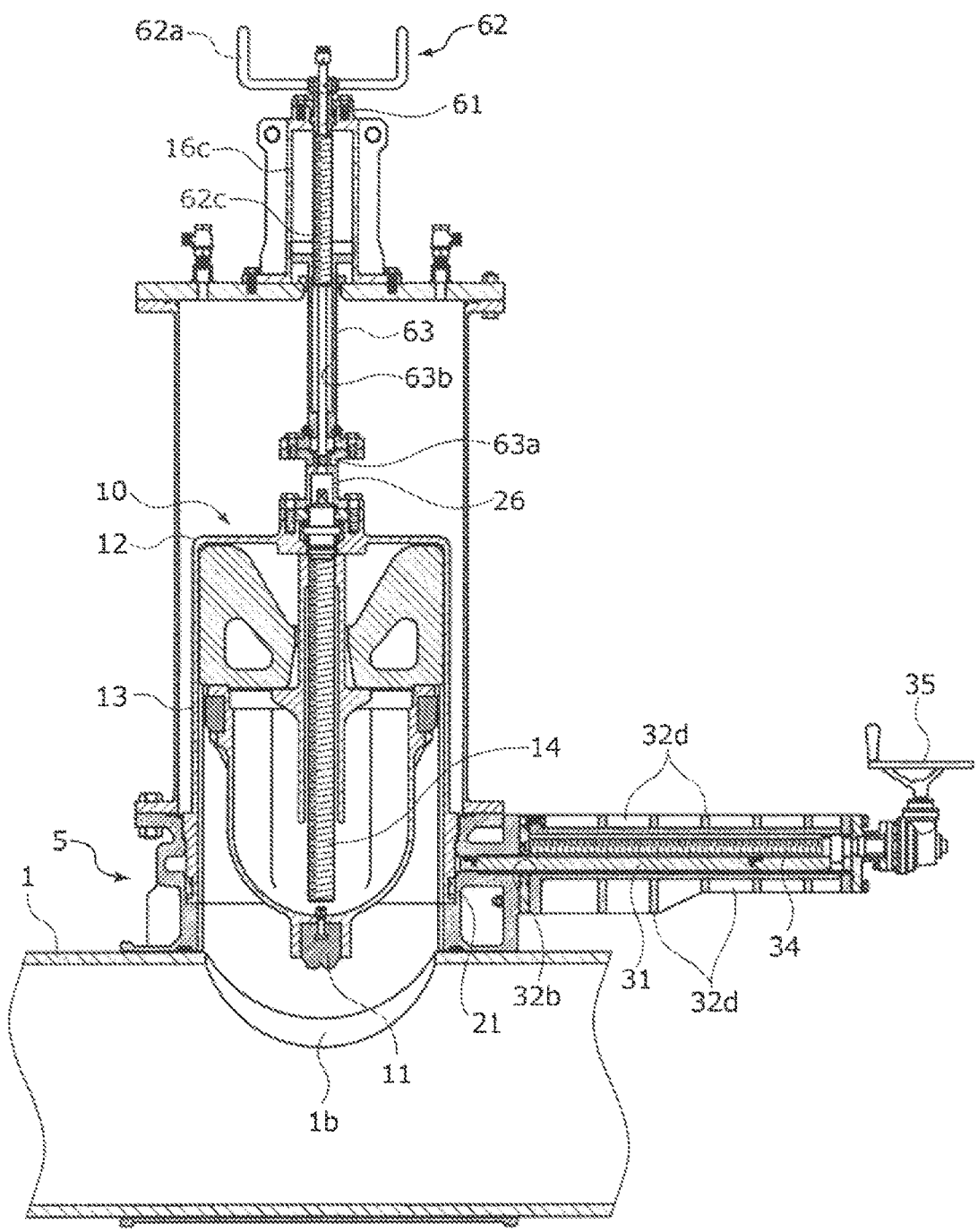
FIG. 11 is a partially cross-sectional front view illustrating the same as that of FIG. 10.
Figure 12:
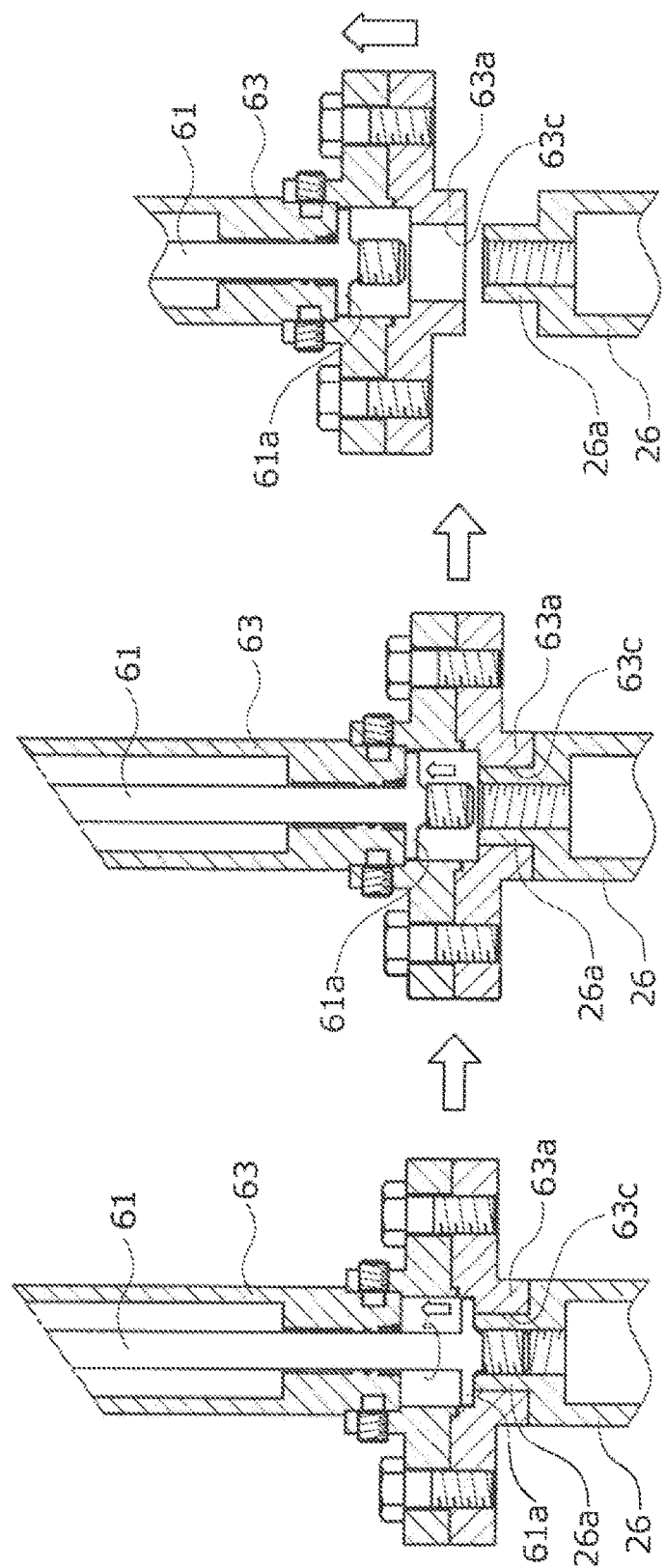
FIGS. 12A to 12C are enlarged cross-sectional views for a portion enclosed by a dotted line of FIG. 8A illustrating a procedure in which the inserter is separated from the fluid control valve.

As illustrated in FIGS. 10 and 11, the fluid control valve 10 is pressed to an installation position in which the sealing member 21 is below the opening 5b passing it and is in close contact with the inner peripheral surface 5j of the neck portion 5d. When a temporary fixing push bolt 5f provided in the flange portion 5e of the neck portion 5d is screwed inward in the radial direction at the installation position, the front end is fitted to a concave portion formed in a projection portion 13d projected outward in the radial direction of the peripheral side portion 13 of the valve housing 12 and hence the fluid control valve 10 inserted into the neck portion 5d of the housing 5 is restricted from coming out upward and rotating with respect to the housing 5.

As described above, the inserter 60 is operated to separate the accommodation cylinder 16 assembled to the fluid control valve 10 after the fluid control valve 10 is installed. More specifically, as illustrated in FIGS. 12A to 12C, the extension bar 61 screwed to the attachment jig 26 is first rotated by rotating a rotation tool (not illustrated) or the like fitted to the upper end thereof to be separated from the attachment jig 26. Next, the gripper 62a of the operation bar 62 is rotated in the reverse rotation direction so that the insertion cylinder 63 screwed to the operation bar 62 is moved upward. Accordingly, the lower end portion 63a is separated from the protruding end portion 26a of the attachment jig 26 fitted thereto in a substantially rectangular shape in a plan view.

As described above, after the inserter 60 is operated to be separated from the fluid control valve 10, the fluid in the pipe introduced into the accommodation cylinder 16 is discharged by a drain portion (not illustrated) and the accommodation cylinder 16 is separated from the housing 5 together with the inserter 60.

In this way, since the inserter 60 which inserts the fluid control valve 10 to the installation position of the housing is attached to the fluid control valve 10 in the sealed state in an attachable and detachable manner, the inserter 60 can be separated without leaking the fluid after the fluid control valve 10 is inserted to the installation position of the housing 5.

Further, air staying in the valve housing 12 of the fluid control valve 10 in the sealed state may be discharged to the outside while opening a through-hole (not illustrated) penetrating the valve housing 12 from the inside to the outside and usually closed by an opening and closing plug or the like at the installation position of the fluid control valve 10. Here, it is preferable to form the through-hole in the vicinity of the upper end of the valve housing 12. With such a configuration, almost the entire amount of the air in the valve housing 12 can be discharged to the outside.

Further, the operation valve device 3 attached to the opening 5b of the housing 5 is sequentially separated. At this time, since the inner peripheral surface 5j below the opening 5b of the neck portion 5d is sealed by the sealing member 21, the leakage of the internal fluid is prevented even when the opening 5b is opened. Therefore, it is possible to separate the operation valve device 3 without performing the sealing operation using the plug 11, and also there is no risk that the operation valve device 3 deteriorates. Further, since a part corresponding to the operation valve housing in the operation valve device 3 is formed in the neck portion 5d of the housing 5, the operation valve device 3 itself can be decreased in size and weight and hence can be easily separated. As illustrated in FIG. 13, a closing lid 9 for hermetically closing the periphery of the opening 5b separated from the operation valve device 3 is attached in an attachable and detachable manner and an annular closing ring 40 is attached to the flange portion 5e of the open end portion 5c of the neck portion 5d by a plurality of fastening members 41 in the circumferential direction.

Second Embodiment

Next, an installation method and an installation device for a fluid control device according to a second embodiment of the present invention will be described with reference to FIGS. 17 and 18. In addition, a part of redundant description of the same components as those of the above-described embodiment will be omitted.

Figure 17B:
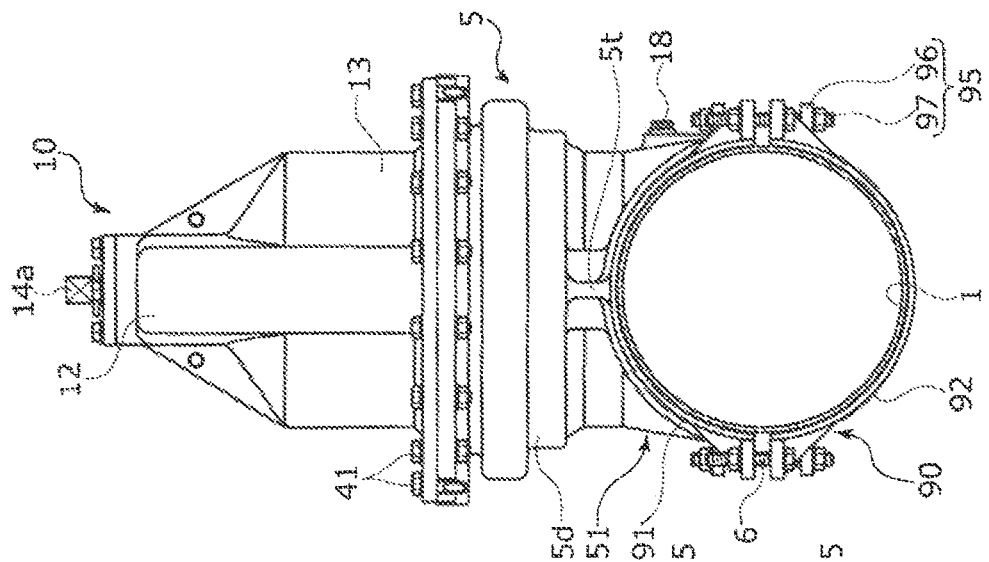
FIG. 17A is a front view of the movement prevention means and FIG. 17B is a side view thereof.

First, as illustrated in FIG. 17, the outer surface of the fluid pipe 1 corresponding to the attachment position of the fluid control device according to the present invention is cleaned and the housing 5 constituting the fluid control device is externally fitted thereto in a sealed state through the seal member 4 (see FIG. 2) for sealing the bored portion of the fluid pipe 1. The housing 5 is a split structure including a plurality of split bodies and mainly includes, in this embodiment, the first split body 51 constituting the upper side and the second split body 52 constituting the lower side. Further, the first split body 51 and the second split body 52 are joined to each other in a sealed state by the fastening member 2 formed as a bolt and a nut.

Figure 17A:
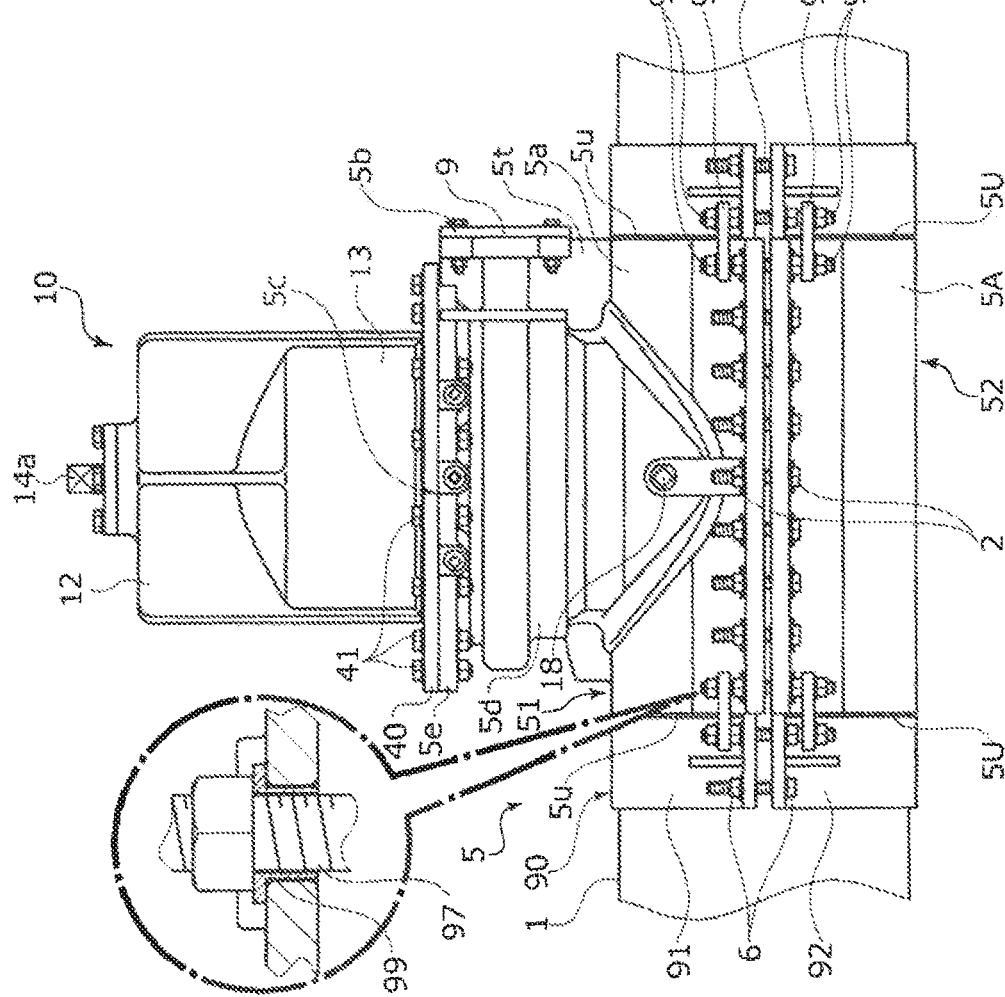
Figure 18:
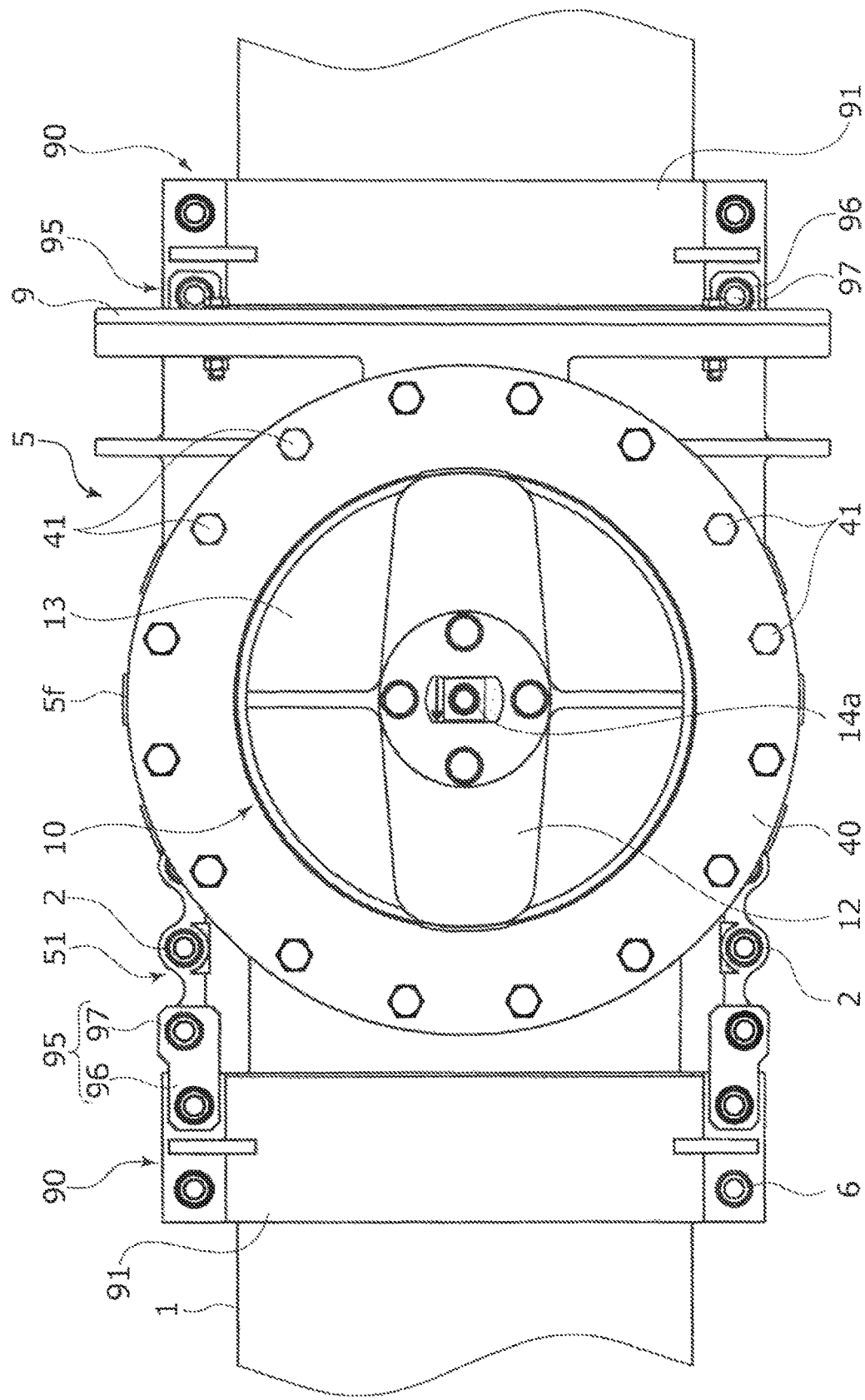
FIG. 18 is a plan view of the same movement prevention means as that of FIG. 17.

As illustrated in FIG. 17A, the first split body 51 of the housing 5 includes the pipeline housing portion 5a which is provided along the fluid pipe 1 so as to be extended in the pipeline direction and the cylindrical neck portion 5d which is provided at the substantial center of the pipeline housing portion 5a so as to be branched and extended in the up and down direction and includes the open end portion 5c opened upward and the opening 5b opened laterally and is formed in an inverse T shape when viewed from the front side. Both ends of the pipeline housing portion 5a in the pipeline direction are provided with end surfaces 5u and 5u which are extended in an arc shape in the circumferential direction and are flat in a direction orthogonal to the pipeline.

Further, the second split body 52 of the housing 5 is formed as a pipeline housing portion 5A which is extended in the pipeline direction along the fluid pipe 1. At both ends of the pipeline housing portion 5A in the pipeline direction, end surfaces 5U and 5U which are extended in an arc shape in the circumferential direction and are flat in a direction orthogonal to the pipeline are substantially flush with the end surfaces 5u and 5u of the first split body 51.

Further, a movement prevention metal fitting 90 which is movement prevention means of this embodiment is externally fitted to the fluid pipe 1 at a position coming into contact with or near the end surfaces 5u and 5u and the end surfaces 5U and 5U at both sides of the housing 5 in the pipeline direction. The movement prevention metal fitting 90 is a split structure including a plurality of division tools and mainly includes, in this embodiment, a first division tool 91 which constitutes an upper side and a second division tool 92 which constitutes a lower side. Further, the first division tool 91 and the second division tool 92 are fastened to each other by the fastening member 6 formed as a bolt and a nut at a fastening force that prevents the relative movement thereof.

Further, the housing 5 and the movement prevention metal fitting 90 are connected to each other through a connection metal fitting 95 which is connection means. More specifically, the connection metal fitting 95 of this embodiment is provided as a pair of upper and lower connection metal fittings so that the first split body 51 of the housing 5 is connected to the first division tool 91 of the movement prevention metal fitting 90 and the second split body 52 of the housing 5 is connected to the second division tool 92 of the movement prevention metal fitting 90. Each connection metal fitting 95 includes a plate-shaped erection piece 96 which is bridged in the pipeline direction between the first split body 51 (the second split body 52) and the first division tool 91 (the second division tool 92) and a connection bolt 97 which is fastened while being inserted through each of the through-hole formed in the erection piece 96, the bolt hole of the first split body 51 (the second split body 52), and the bolt hole of the first division tool 91 (the second division tool 92). Additionally, as illustrated in FIG. 17, the attachment position of the connection metal fitting 95 may be disposed outside a nut constituting the fastening member 2 for fastening the first split body 51 and the second split body 52 and a nut constituting the fastening member 6 for fastening the first division tool 91 and the second division tool 92 or the attachment position of the connection metal fitting 95 may be disposed inside a nut constituting the fastening member 2 and a nut constituting the fastening member 6, that is, a position contacting the flange connecting the first split body 51 and the second split body 52 to each other and the flange connecting the first division tool 91 and the second division tool 92 to each other.

Further, as indicated by a portion enclosed by a dotted line in FIG. 17, a spacer 99 which is a cylindrical body having a diameter smaller than the through-hole and larger than the connection bolt 97 may be provided in the through-hole formed in the flange connecting the first split body 51 and the second split body 52 to each other and the flange connecting the first division tool 91 and the second division tool 92 to each other or the through-hole of the erection piece 96 where the connection bolt 97 is inserted. With such a configuration, the movement gap of the connection bolt 97 can be reduced. Similarly, although particularly not illustrated in the drawings, a cylindrical spacer may be provided in the through-hole formed in the flanges of the first split body 51 and the second split body 52 for inserting the fastening member 2 therethrough or the through-hole formed in the flanges of the first division tool 91 and the second division tool 92 for inserting the fastening member 6 therethrough. Further, the length of the portion of the spacer 99 inserted into the through-hole may be, for example, a length of the portion simultaneously inserted into the through-holes coaxially disposed in the up and down direction of the flange connecting the first split body 51 and the second split body 52 to each other, that is, a length of the portion simultaneously inserted into a plurality of through-holes. Additionally, the movement may be prevented by disposing the movement prevention metal fittings 90 and 90 so as to be in contact with the end surfaces 5u and 5u of the first split body 51 and the end surfaces 5U and 5U of the second split body 52 of the housing 5 without using the connection metal fitting 95 or the spacer 99.

Although particularly not illustrated in the drawings, the inner peripheral surfaces of the first division tool 91 and the second division tool 92 constituting the movement prevention metal fitting 90 are provided with single or multiple locking protrusions, for example, similarly to a locking protrusion 120b illustrated in FIG. 22 to be described later and the locking protrusions bite into the outer surface of the fluid pipe 1. A plurality of the locking protrusions extending in the circumferential direction may be provided in the axial direction and may be formed in, for example, a spiral shape, a mesh shape, a lattice shape, or the like. Alternatively, the locking protrusions may not be provided. Further, a rubber plate as an anti-slip material may be attached to the inner peripheral surfaces of the first division tool 91 and the second division tool 92 constituting the movement prevention metal fitting 90. With such a configuration, the movement prevention metal fitting 90 is maintained at the external fitting position without any relative movement with respect to the outer surface of the fluid pipe 1. As the anti-slip material, for example, a plurality of small rubber materials may be scattered and attached or the division tool itself may be made of a material such as a resin having low slipperiness.

In this way, since the movement prevention metal fittings 90 and 90 are provided at the positions coming into contact with or near both sides of the housing 5 in the pipeline direction, the movement in the pipeline direction is prevented even when a load to be described later occurs in the housing 5.

As described above, when the plug 11 (see FIG. 14) inside the fluid control valve 10 connected to the first split body 51 constituting the housing 5 is moved downward to close the inside of the fluid pipe 1, the pressure in the pipe directed toward the downstream side is applied to the plug 11 and is further applied to the first split body 51 through the plug 11.

Thus, an external force is applied in a direction in which the first split body 51 moves toward the downstream side with respect to the second split body 52 by at least the loose fitting size of the bolt hole through which the fastening member 2 is inserted (for example, about 10 mm).

In contrast, since the movement prevention metal fitting 90 provided on the downstream side of the housing 5 in the pipeline direction is in contact with the end surface 5u of the first split body 51 of the housing 5, it is possible to prevent the first split body 51 from moving so as to stay at the original position against the external force applied to the downstream side of the first split body 51.

Further, since the movement prevention metal fitting 90 provided on the upstream side of the housing 5 in the pipeline direction is connected to the housing 5 through the connection metal fitting 95, it is possible to support the first split body 51 so that the first split body stays at the original position against the external force applied to the downstream side of the first split body 51.

In this way, since the movement prevention metal fitting 90 that prevents the movement of the housing 5 in the pipeline direction is installed in the fluid pipe 1, it is possible to prevent the movement of the housing 5 by the movement prevention metal fitting 90 even when the fluid control valve 10 is closed and the pressure of the fluid in the pipe is applied to the housing 5. Accordingly, it is possible to maintain high controllability of the fluid.

Furthermore, when the plug 11 is moved upward so as to open the inside of the fluid pipe 1 from the closed state of the fluid control valve 10, the load of the plug 11 pressed toward the downstream side in the closed state is released and the elastic restoring force of the elastic material forming the plug 11 acts on the first split body 51 to return towards the original upstream position.

Further, when the movement prevention metal fitting 90 is attached to the housing 5 provided with the boring machine 7 during the boring illustrated in FIG. 4, the positional deviation of the hole 1b can be suppressed.

Next, first to fourth modified examples of the movement prevention means will be described with reference to FIGS. 19 to 23. In addition, a part of redundant description of the same components as those of the above-described embodiment will be omitted.

Figures 19A, 19B:
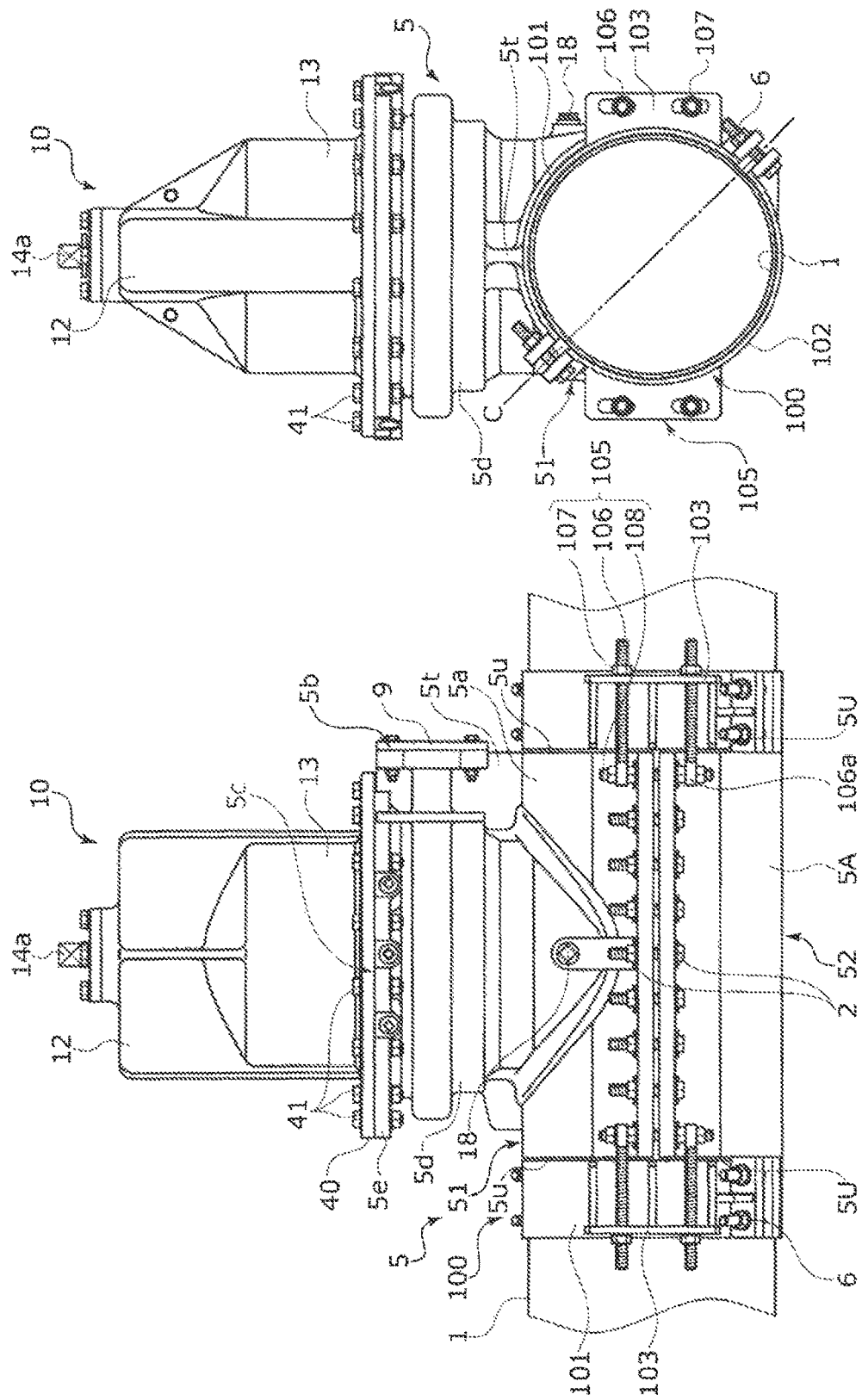
FIG. 19A is a front view of the movement prevention means and FIG. 19B is a side view thereof.
Figure 20:
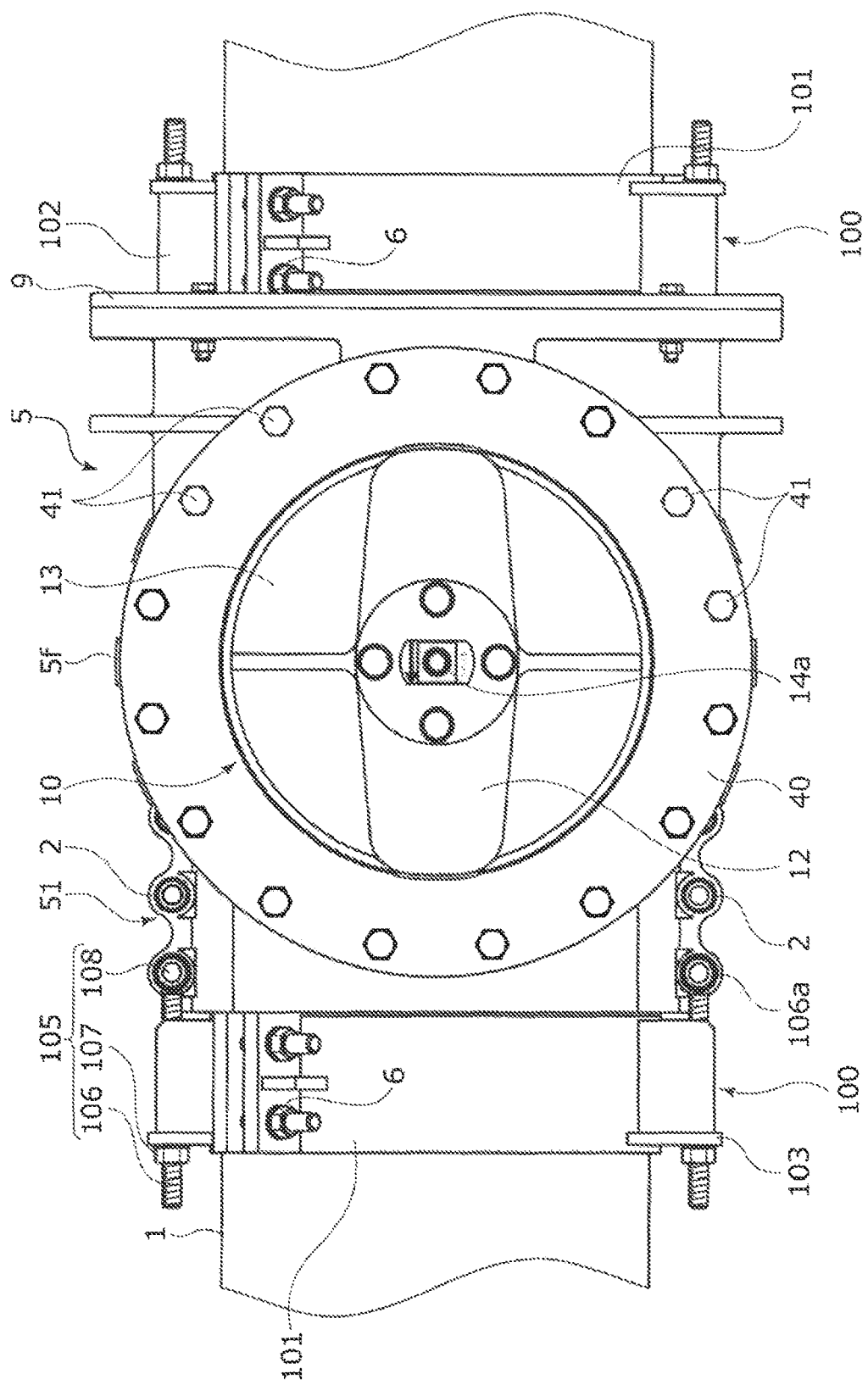
FIG. 20 is a plan view of the same movement prevention means as that of FIG. 19.

As illustrated in FIGS. 19 and 20, a movement prevention metal fitting 100 which is the movement prevention means of the first modified example is externally fitted to the fluid pipe 1. In this modified example, as illustrated in FIG. 19B, the movement prevention metal fitting 100 is a split structure including a plurality of division tools and mainly includes first and second division tools 101 and 102 respectively forming an oblique upper side and an oblique lower side with a virtual inclined surface C inclined about 45° with respect to a horizontal plane as a boundary. Further, the first division tool 101 and the second division tool 102 are fastened to each other by the fastening member 6 formed as a bolt and a nut with a fastening force that prevents the relative movement thereof.

Further, the housing 5 and the movement prevention metal fitting 100 are connected to each other through a connection metal fitting 105 which is connection means. More specifically, the connection metal fitting 105 of this modified example is provided as a pair of connection metal fittings in the circumferential direction so as to connect the first and second split bodies 51 and 52 of the housing 5 and the first division tool 101 of the movement prevention metal fitting 100 and connect the first and second split bodies 51 and 52 of the housing 5 and the second division tool 102 of the movement prevention metal fitting 100. Each connection metal fitting 105 includes an erection bolt 106 which is bridged in the pipeline direction to a flange 103 fixed to the first division tool 101 (the second division tool 102) and the first and second split bodies 51 and 52, a connection nut 107 which is screwed into the erection bolt 106 to engage with the flange 103, and a connection bolt 108 which engages with an engagement portion 106a formed in the head portion of the erection bolt 106 and is fastened while being inserted through the bolt holes of the first and second split bodies 51 and 52.

According to such a configuration, the housing 5 and the movement prevention metal fitting 100 can be adjusted to a close contact state, a contact state, or an approaching state in the pipeline direction in a stepless manner by appropriately setting the screwing degree between the erection bolt 106 and the connection nut 107 constituting the connection metal fitting 105.

Figure 21:
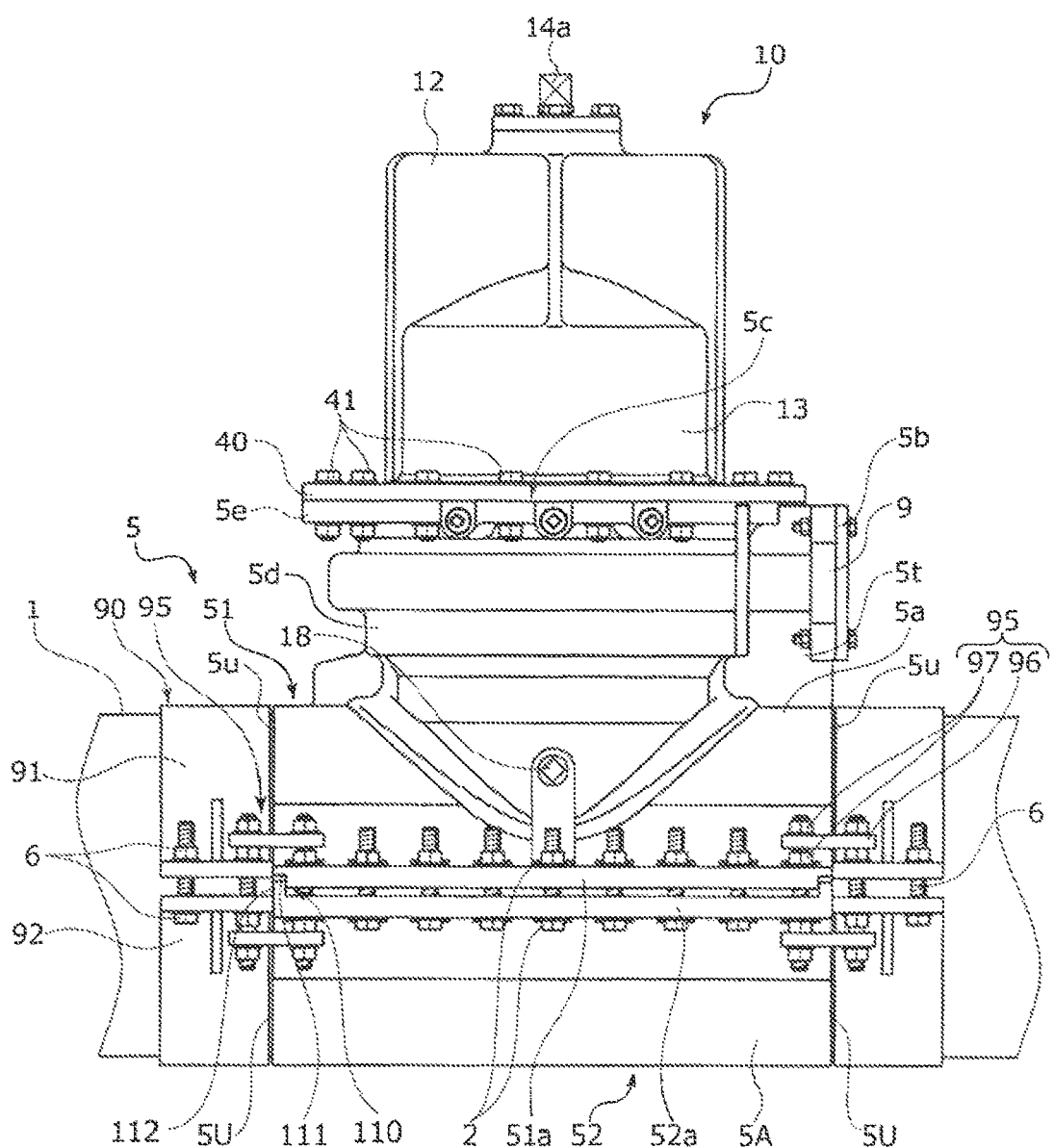
FIG. 21 is a front view illustrating a second modified example of the movement prevention means.

Next, as illustrated in FIG. 21, the movement prevention means of the second modified example includes the movement prevention metal fitting 90 externally fitted to the fluid pipe 1 and an engagement portion 110 provided in the housing 5. More specifically, the engagement portion 110 includes a concave portion 111 which is formed at both end portions of the flange 51a of the first split body 51 for the fastening member 2 and a convex portion 112 which is formed at both end portions of the flange 52a of the second split body 52 and engages with the concave portion 111 in the pipeline direction.

According to such a configuration, when the pressure in the pipe is applied to the first split body 51 toward the downstream side in accordance with the movement of the plug 11 in the fluid control valve 10, the concave portion 111 formed in the first split body 51 engages with the convex portion 112 of the second split body 52 while the movement prevention metal fitting 90 provided at the downstream side of the housing 5 in the pipeline direction acts against the external force applied to the first split body 51. Accordingly, the convex portion 112 can prevent the movement of the first split body 51 against the external force applied to the first split body 51 in the pipeline direction. In this case, the second split body 52 can be also used as a movement prevention tool by omitting the movement prevention metal fitting 90 and the connection metal fitting 95. At this time, the inner peripheral surface of the second split body 52 may be provided with single or multiple locking protrusions which are similar to those provided on the inner peripheral surface of the movement prevention metal fitting 90. Further, the engagement may be performed by using the spacer 99 instead of the engagement between the concave portion 111 and the convex portion 112.

Figure 22:
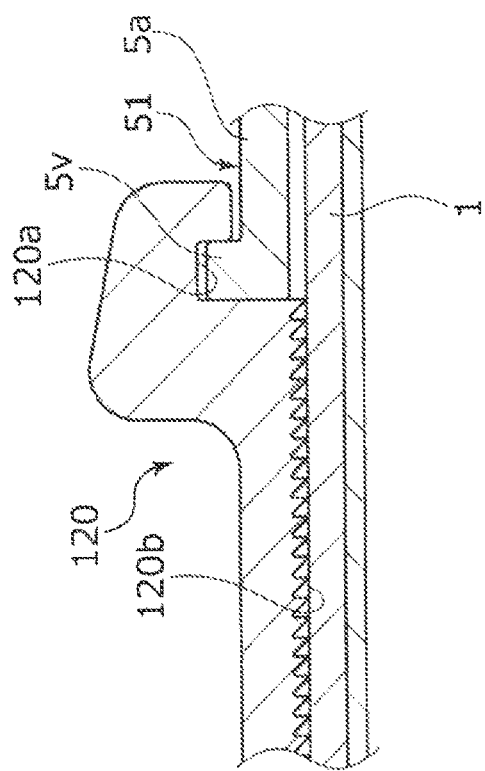
FIG. 22 is a partially enlarged cross-sectional view illustrating a third modified example of the movement prevention means.

Next, as illustrated in FIG. 22, the movement prevention means of the third modified example is configured as a movement prevention metal fitting 120 which is externally fitted to the fluid pipe 1 at both sides of the housing 5 in the pipeline direction. More specifically, the movement prevention metal fitting 120 includes an engagement concave portion 120a which engages with a bulging portion 5v that bulges outward in the radial direction at the end of the first split body 51 of the housing 5 in the pipeline direction and a plurality of locking protrusions 120b which are formed in the axial direction along the circumferential direction in the inner peripheral surface of the movement prevention metal fitting 120. Additionally, the locking protrusion 120b may be provided with only a single number or may not be.

According to such a configuration, when the pressure in the pipe is applied to the first split body 51 toward the downstream side in accordance with the movement of the plug 11 in the fluid control valve 10, the engagement concave portion 120a of the movement prevention metal fitting 120 provided at the upstream side of the housing 5 in the pipeline direction is locked to the bulging portion 5v of the first split body 51 and the locking protrusion 120b bites into the outer peripheral surface of the fluid pipe 1. Accordingly, the movement prevention metal fitting 120 can prevent the movement of the first split body 51 against the external force applied to the first split body 51 in the pipeline direction.

Figure 23:
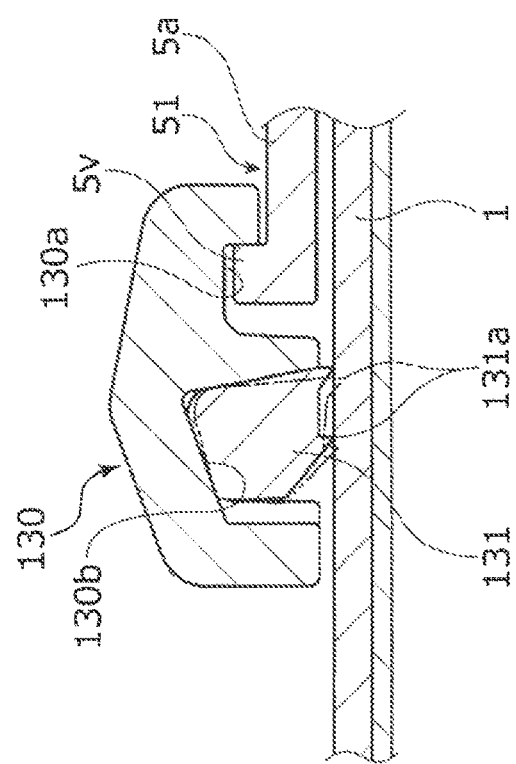
FIG. 23 is a partially enlarged cross-sectional view illustrating a fourth modified example of the movement prevention means.

Next, as illustrated in FIG. 23, the movement prevention means of the fourth modified example is configured as a movement prevention metal fitting 130 which is externally fitted to the fluid pipe 1 at both sides of the housing 5 in the pipeline direction. More specifically, the movement prevention metal fitting 130 includes an engagement concave portion 130a which engages with the bulging portion 5v bulging outward in the radial direction at the end portion of the first split body 51 of the housing 5 in the pipeline direction and a locking member 131 that is provided in the concave portion 130b formed on the inner surface of the movement prevention metal fitting 130.

According to such a configuration, when the pressure in the pipe is applied to the first split body 51 toward the downstream side in accordance with the movement of the plug 11 in the fluid control valve 10, the engagement concave portion 130a of the movement prevention metal fitting 130 provided at the upstream side of the housing 5 in the pipeline direction is locked to the bulging portion 5v of the first split body 51 and a front end claw 131a formed at the inner radial side bites into the outer peripheral surface of the fluid pipe 1 (see a dotted portion in the drawing) in accordance with the clockwise tilting operation in the drawing of the locking member 131 within the concave portion 130b. Accordingly, the movement prevention metal fitting 130 can prevent the movement of the first split body 51 against the external force applied to the first split body 51 in the pipeline direction. Although particularly not illustrated in the drawings, the movement prevention metal fitting 130 may be provided with a push bolt for press-inserting the locking member 131.

As described above, according to the installation method and the installation device for the fluid control device of the present invention, since the annular sealing member 21 can perform a sealing operation at the installation position in which the front end of the valve housing 12 of the fluid control valve 10 exceeds the opening 5b in the neck portion 5d while the inner part side of the open end portion 5c and the outer part side surrounding the open end portion 5c in a sealed state have the same pressure, the opening 5b and the open end portion 5c can be closed at the same time in the sealed state. Accordingly, even when the fluid pipe 1 has a relatively large diameter, the fluid control valve 10 can be accurately installed at a desired position by reducing a pressing force required for installing the fluid control valve and a support point when inserting the valve body 11 of the fluid control valve 10 into the hole 1b of the fluid pipe 1 is secured. Accordingly, the controllability of the fluid in the pipe can be improved by improving the positional accuracy of the valve body 11. Further, the operation valve device 3 which is decreased in weight and size can be easily attached and detached without requiring the operation of the valve body 11.

Further, since the housing 5 is a split structure externally fitted to the fluid pipe 1 in a sealed state and the hole 1b of the fluid pipe 1 is bored by the boring machine 7, it is possible to insert the valve body 11 by boring the existing fluid pipe 1 in a continuous flow state. Particularly, since the opening 5b for attaching and detaching the operation valve device 3 is provided in the neck portion 5d of the housing 5 and the installation position of the operation valve device 3 can be made close to the fluid pipe 1, the boring stroke is shortened. Accordingly, it is possible to minimize the boring positional deviation and to decrease the size, weight, and cost of construction equipment such as the boring machine 7 or the operation valve device 3.

Further, since the annular sealing member 21 can perform a sealing operation at the installation position in which the front end of the valve housing 12 of the fluid control valve 10 exceeds the opening 5b of the neck portion 5d by opening the operation valve body 31 in a state that the inside of the housing 5 divided by the operation valve body 31 is in a communication state at the same pressure, the opening 5b and the open end portion 5c can be closed at the same time in the sealed state. Thus, it is possible to accurately install the fluid control valve 10 at a desired position by reducing a pressing force required for installing the fluid control valve 10.

Although the embodiments of the present invention have been described above with reference to the drawings, the specific configuration is not limited to these embodiments and modifications or additions within the scope not departing from the spirit of the present invention are also included in the present invention.

For example, in the above-described embodiments, the hole 1b is bored in the fluid pipe 1 in the housing 5 by boring means and the plug 11 (the valve body) of the fluid control valve 10 is inserted into the hole 1b. However, the hole of the fluid pipe of the present invention is not limited thereto. For example, the hole may be a hole such as a branch hole formed in advance in a tee as a fluid pipe or may be a sluice valve joined to the fluid pipe with a flange or in a manner of a socket and spigot.

Further, for example, in the above-described embodiments, the operation valve device 3 is separated after installing the fluid control valve 10 and the closing lid 9 having a flat plate shape is connected to the opening 5b of the housing 5 in a sealed state. However, the present invention is not limited thereto. For example, as a modified example of the closing lid, as illustrated in FIG. 16, a closing lid 45 which is a holding member according to the present invention may include a flat plate-shaped covering portion 46 which covers the opening 5b in a sealed state and an outer fitting portion 47 which is formed to be continuous thereto and is bifurcated in a substantially U-shape in a plan view so as to be externally fitted along the peripheral surface of the valve housing 12 of the fluid control valve 10 and the outer peripheral surface of the peripheral side portion 13 of the valve housing 12 may be provided with a concave groove 13e to which the outer fitting portion 47 is fitted. With such a configuration, since the opening 5b of the housing 5 can be sealed by using the opening 5b communicating with the inside of the neck portion 5d and at the same time, the outer fitting portion 47 of the closing lid 45 can be externally fitted to the concave groove 13e of the peripheral side portion 13 of the valve housing 12, it is possible to prevent the fluid control valve 10 from coming off from the housing 5 by easily holding the fluid control valve 10. Further, since the closing lid 45 is used, the temporary fixing push bolt 5f provided in the housing 5 of the above-described embodiment can be omitted and hence the structure can be simplified.

Further, the concave groove 13e of the peripheral side portion 13 of the valve housing 12 may be recessed endlessly over the entire circumference of the valve housing 12. However, when the concave groove is recessed over approximately half a circumference as in this modified example, the fluid control valve 10 can be positioned in the circumferential direction in such a manner that a front end portion 47a of the outer fitting portion 47 comes into contact with a circumferential end portion 13f of the concave groove 13e.

Figure 9B:
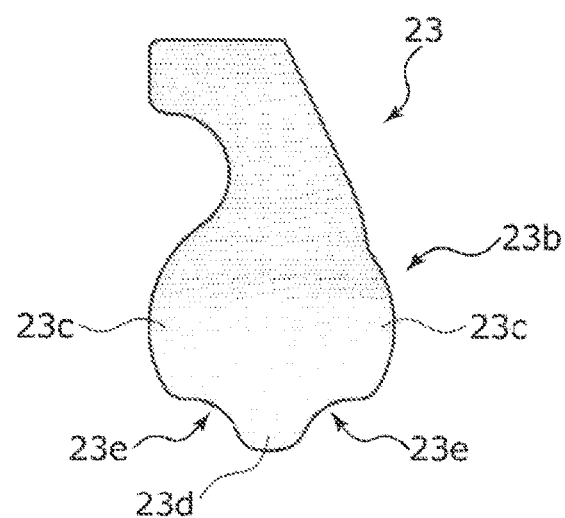
FIG. 9B is a cross-sectional view illustrating a first modified example of the sealing member.

Further, for example, in the above-described embodiments, the deformed portion 21b which allows the elastic deformation of the sealing member 21 is formed in a substantially bulbous cross-sectional shape that smoothly bulges inward and outward in the radial direction and toward the front end, but the present invention is not limited thereto. For example, as the first modified example of the sealing member according to the present invention, as illustrated in FIG. 9B, the deformed portion 23b of the sealing member 23 may include a bulging portion 23c which bulges inward and outward in the radial direction, a protrusion portion 23d which protrudes toward a front end, and a concave portion 23e which is formed in a concave shape over these portions. With such a configuration, since it is possible to obtain a lip seal effect in which the bulging portion 21c is in close contact with the inner peripheral surfaces 5h and 5j of the neck portion 5d and the concave portion 13b of the peripheral side portion 13 by applying the pressure of the fluid in the pipe to the surface of the concave portion 23e which is formed in a concave shape over the protrusion portion 23d and the bulging portion 23c bulging inward and outward in the radial direction, it is possible to improve the sealability.

Figure 9C:
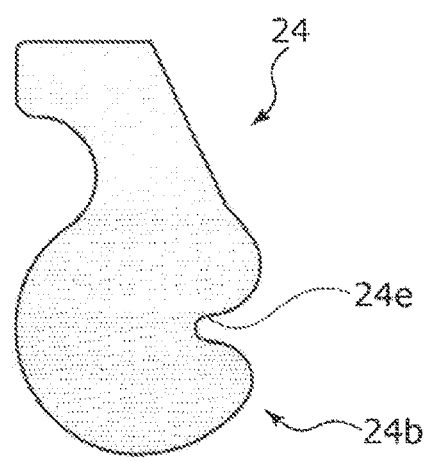
FIG. 9C is a cross-sectional view illustrating a second modified example of the sealing member.

Alternatively, as the second modified example of the sealing member according to the present invention, as illustrated in FIG. 9C, the deformed portion 24b of the sealing member 24 may be formed in a substantially circular shape in cross-section with a notch portion 24e on the outer peripheral portion thereof. With such a configuration, since it is possible to increase the elastic deformation allowance in the outer radial direction, it is possible to improve the sealing function between the inner peripheral surface of the neck portion and the deformed portion 24b after the elastic deformation.

Furthermore, for example, in the above-described embodiments, the fluid control valve 10 includes the plug 11 which passes through the hole 1b of the fluid pipe 1 and comes into close contact with the inner peripheral surface 1c as the valve body, but the present invention is not limited thereto. For example, any valve body can be adopted if the fluid in the pipe can be controlled.

Further, for example, in the above-described embodiments, the boring is performed by the hole saw 72a having a diameter smaller than that of the fluid pipe 1, but the present invention is not limited thereto. A part of the fluid pipe in the housing 5 may be cut with a hole saw having a diameter larger than that of the fluid pipe 1, a cutting-off tool device, a wire saw device, or the like and cut pieces may be removed. Then, a plug which uses the inner peripheral surface of the housing as a valve seat or a fluid control valve having an internal valve box with a built-in valve body may be installed in a continuous flow state.

Furthermore, for example, in the above-described embodiments, the communication opening 17 and the communication opening 27 communicate with each other by the connection hose 25 to be the same pressure, but the present invention is not limited thereto. For example, a configuration may be employed in which the valve housing 12 is provided with a through-hole (not illustrated), a check valve is connected to the through-hole, and the check valve is opened when inserting the fluid control valve or is closed after inserting the fluid control valve so as to take the same pressure and bleed air at the same time.

REFERENCE SIGNS LIST 1 fluid pipe
1b hole
1c inner peripheral surface
3 operation valve device
5 housing
5b opening
5c open end portion
5d neck portion
5e flange portion
5f push bolt
5h inner peripheral surface
5j inner peripheral surface
7 boring machine
8 discharger
9 closing lid
10 fluid control valve
11 plug (valve body)
12 valve housing
13 peripheral side portion
14 shaft member
16 accommodation cylinder
17 communication opening
18 opening and closing plug
21 sealing member
21b deformed portion
23 sealing member
24 sealing member
25 connection hose
26 attachment jig
27 communication opening
28 air vent hole
29 discharge hose
31 operation valve body
32 accommodation member
34 shaft member
40 closing ring
45 closing lid
46 covering portion
47 outer fitting portion
51 first split body
52 second split body
60 inserter
61 extension bar
62 operation bar
63 insertion cylinder
71 attachment flange cylinder
72 cutter
73 advancing and retracting mechanism
74 drive motor
81 attachment flange plate
83 flexible cylinder
84 operation cylinder
85 discharge pipe
90 movement prevention metal fitting (movement prevention means)
99 spacer
100 movement prevention metal fitting (movement prevention means)

110 engagement portion (movement prevention means)
120 movement prevention metal fitting (movement prevention means)
130 movement prevention metal fitting (movement prevention means)

The invention claimed is:

1. A method of installing a fluid control device in a continuous flow state, the fluid control device including at least a housing installed in a fluid pipe in a sealed state and a fluid control valve having a valve body and a valve housing insertable into a hole of the fluid pipe bored by a boring machine through the housing, said method comprising:
providing the housing with a one piece neck portion having an opening formed in a side of the neck portion and an open end portion formed in the top of the neck portion;
installing, at the opening in the neck portion of the housing, an operation valve device having an operation valve body dividing an inside of the housing in an openable and closeable manner;
opening the operation valve body while surrounding the open end portion in the neck portion in a sealed state;
the fluid control valve being provided with an annular sealing member in a front end of the valve housing; and
inserting the fluid control valve communicating with the inside of the housing in a sealed state from the open end portion to an installation position in which the annular sealing member in the front end of the valve housing of the fluid control valve exceeds the opening of the neck portion so that the annular sealing member seals a gap between a peripheral surface of the valve housing and a peripheral surface of the neck portion at the installation position while an inner part side of the open end portion and an outer part side surrounding the open end portion in a sealed state have the same pressure.

2. The method of installing the fluid control device according to claim 1, wherein the inside of the housing is made to communicate with the outside so that air in the housing is discharged to the outside.

3. The method of installing the fluid control device according to claim 2, wherein the housing is a split structure for externally fitting the fluid pipe in a sealed state and the hole in the fluid pipe is bored by a boring machine.

4. The method of installing the fluid control device according to claim 2, wherein a movement prevention fitting for preventing movement of the housing is installed on the fluid pipe.

5. The method of installing the fluid control device claim 2, wherein the inside of the housing is made to communicate with the outside so that the inside and the outside have the same pressure when the operation valve body is opened.

6. The method of installing the fluid control device according to claim 2, wherein a communication opening for allowing the inside of the housing to be communicated with the outside is provided in the neck portion.

7. The method of installing the fluid control device according to claim 2, wherein a communication opening for allowing the inside of the housing to communicate with the outside is provided in an operation valve housing of the operation valve device.

8. The method of installing the fluid control device according to claim 2, wherein a holding member holding the fluid control valve provided in the housing is attached to the opening of the neck portion in a sealed state.

9. The method of installing the fluid control device according to claim 1, wherein the housing is a split structure for externally fitting the fluid pipe in a sealed state and the hole of the fluid pipe is bored by a boring machine.

10. The method of installing the fluid control device according to claim 9, wherein a movement prevention fitting for preventing movement of the housing is installed on the fluid pipe.

11. The method of installing the fluid control device claim 9, wherein the inside of the housing is made to have the same pressure on either side of the valve body before the operation valve body is opened.

12. The method of installing the fluid control device according to claim 9, wherein a communication opening for allowing the inside of the housing to be communicated with the outside is provided in the neck portion.

13. The method of installing the fluid control device according to claim 9, wherein a communication opening for allowing the inside of the housing to communicate with the outside state is provided in an operation valve housing of the operation valve device.

14. The method of installing the fluid control device according to claim 1, wherein a movement prevention fitting for preventing movement of the housing is installed on the fluid pipe.

15. The method of installing the fluid control device claim 1, wherein the inside of the housing is made to have the same pressure on either side of the valve body before the operation valve body is opened.

16. The method of installing the fluid control device according to claim 1, wherein a communication opening for allowing the inside of the housing to communicate with the outside is provided in the neck portion.

17. The method of installing the fluid control device according to claim 1, wherein a communication opening for allowing the inside of the housing to communicate with the outside state is provided in an operation valve housing of the operation valve device.

18. The method of installing the fluid control device according to claim 1, wherein a holding member holding the fluid control valve provided in the housing is attached to the opening of the neck portion in a sealed state.

19. A fluid control device installed in a continuous flow state, the fluid control device including at least a housing installed on a fluid pipe in a sealed state and a fluid control valve having a valve body and a valve housing insertable into a hole of the fluid pipe bored by a boring machine through the housing, said device comprising:
the housing being provided with a one piece neck portion having an opening formed in a side of the neck portion and an open end portion formed in the top of the neck portion;
an operation valve device which includes an operation valve body attached to the opening formed in the neck portion of the housing and dividing an inside of the housing in an openable and closeable manner and opened while surrounding the open end portion formed in the neck portion in a sealed state;
the fluid control valve being provided with an annular sealing member in a front end of the valve housing; and
the annular sealing member that seals a gap between a peripheral surface of the valve housing and a peripheral surface of the neck portion at an installation position by inserting the fluid control valve communicating with the inside of the housing in a sealed state from the open end portion to the installation position in which the annular sealing member in the front end of the valve housing of the fluid control valve exceeds the opening of the neck portion while an inner part side of the open end portion and an outer part side surrounding the open end portion in a sealed state have the same pressure.

20. The device for installing the fluid control device according to claim 19, wherein a movement prevention fitting for preventing movement of the housing from moving is installed on the fluid pipe.

\* \* \* \* \*